(12) United States Patent
Tanaka et al.

(10) Patent No.: US 7,415,616 B2
(45) Date of Patent: Aug. 19, 2008

(54) CIPHER STRENGTH EVALUATION APPARATUS

(75) Inventors: Hidema Tanaka, Koganei (JP); Toshinobu Kaneko, Noda (JP); Yasuo Hatano, Noda (JP)

(73) Assignee: National Institute of Information and Communications Technology, Tokyo (JP)

( * ) Notice: Subject to any disclaimer, the term of this patent is extended or adjusted under 35 U.S.C. 154(b) by 850 days.

(21) Appl. No.: 10/762,653

(22) Filed: Jan. 21, 2004

(65) Prior Publication Data

US 2005/0160262 A1 Jul. 21, 2005

(51) Int. Cl.
G06F 11/25 (2006.01)

(52) U.S. Cl. .............................. 713/189; 380/37; 726/25

(58) Field of Classification Search .................. 713/189, 713/166, 168; 726/25; 380/28, 37, 42
See application file for complete search history.

(56) References Cited

U.S. PATENT DOCUMENTS

| | | | |
|---|---|---|---|
| 6,189,095 B1 * | 2/2001 | Coppersmith et al. ....... | 713/150 |
| 6,751,319 B2 * | 6/2004 | Luyster ........................ | 380/37 |
| 7,043,016 B2 * | 5/2006 | Roelse ......................... | 380/29 |
| 7,227,948 B2 * | 6/2007 | Ohkuma et al. .............. | 380/37 |
| 2002/0021801 A1 * | 2/2002 | Shimoyama et al. .......... | 380/29 |

OTHER PUBLICATIONS

S.Moriai, T.Shimoyama, T.Kaneko, "Higher Order Attack of a CAST Cipher", Fast Software Encryption 1998, FSE-4th, LNCS. 1372. 1998.
T.Shimoyama, S.Moriai, T.Kaneko and S.Tsuji,"Improved Higher Order Differential Attack and Its Application to Nyberg-Knudsen's Designed Block Cipher", IEICE Trans. Fundamen tals, vol. E82-A, No. 9 pp. 1971-1980, 1999.
M.Matsui,"New Block Encryption Algorithm MISTY, "Fast Software Encryption 1997 FSE 1997, pp. 54-67, 1997.
H.Tanaka, T.Kaneko, "An Attack of 6-round MISTY1 without FL functions", TECHMCALREPORT of IEICE, pp. 53-59, 2002.

* cited by examiner

*Primary Examiner*—Ellen Tran

(57) ABSTRACT

A Feistel encryption apparatus having a plurality of steps of accepting unstirred text, stirring with an extended key, and calculating stirred text for encrypting plaintext step by step, the apparatus is allowed to utilize cryptanalysis conditions held at given predetermined steps, and decryption with higher order differences determined from stirred text at these steps is allowed. The invention can secure all the estimated extended keys including the last-step extended key to be right with a desired probability as well as it allows decryption by less complexity. The invention allows MISTY1 with six rounds without an FL function to be decrypted with $2^{39}$ of selected plaintext and the complexity of $2^{49}$ of an FO function. It also allows MISTY1 with seven rounds without the FL function to be decrypted with $2^{39}$ of selected plaintext and the complexity of $2^{124}$ of the FO function.

12 Claims, 21 Drawing Sheets

CIPHER STRENGTH EVALUATION APPARATUS

BACKGROUND OF THE INVENTION

A Feistel encryption algorithm has a plurality of stirring steps of separating stirred text into two sub-blocks right and left, forming one sub-block to be the sub-block of unstirred text as it is and the other to be stirred, and calculating unstirred text with the other stirred sub-block for encrypting plaintext step by step.

MISTY1, which is this type of Feistel encryption algorithm, includes stirring steps of the Feistel structure formed of an FO function and an FL function being an auxiliary function, having provable security against linear cryptanalysis and differential cryptanalysis, to which eight rounds is recommended for use.

Kuhn shows that traditional MISTY1 with six rounds without the FL function can be attacked by impossible differential attack with $2^{54}$ of plain text and $2^{61}$ of complexity. Here, the FL function is a linear function as long as a key is fixed, which does not affect provable security.

Then, the inventor applies traditional higher-order differential cryptanalysis to MISTY1 with six rounds without the FL function, which is the Feistel encryption algorithm, and uses a cryptanalysis method combined with a level-1 first-round elimination to allow MISTY1 with six rounds without the FL function to be encrypted with $2^{39}$ of selected plaintext and the complexity of $2^{49}$ of the FO function and to allow MISTY1 with seven rounds without the FL function to be encrypted with $2^{39}$ of selected plaintext and the complexity of $2^{124}$ of the FO function.

Here, the level-1 nth round elimination is a decryption method based on plaintext that stirred text at the nth step satisfies a predetermined condition.

SUMMARY OF THE INVENTION

When this cryptanalysis method of combining higher-order differential cryptanalysis with the level-1 nth round elimination is used, a cryptanalysis condition held at given predetermined steps can be utilized for a Feistel encryption apparatus having a plurality of steps of accepting unstirred text, stirring with an extended key, and calculating stirred text for encrypting plaintext step by step, and decryption is allowed with the use of the characteristics held in higher order differences determined from stirred text at these steps.

In addition to this, particularly, a cryptanalysis condition with higher order differences is expressed by simultaneous linear equations and is solved by an algebraic technique to allow decryption by less complexity, and fixed redundancy is provided for the cryptanalysis condition to allow all the estimated extended keys to be insured that they become right with a desired probability as well as the extended key at the last step.

More specifically, ciphertext is obtained by accepting stirred text at a predetermined step, estimating plaintext based on the stirred text, and encrypting the plaintext. A cryptanalysis condition relating to a higher order difference held between the cipher text and the stirred text is utilized. It can be used to calculate a right extended key at the last step based on stirred text at a given step and ciphertext.

Ciphertext is estimated by accepting stirred text at a predetermined step, estimating plaintext based on the stirred text, and encrypting the plaintext. A cryptanalysis condition relating to a higher order difference held between the stirred text and stirred text at a second predetermined step estimated based on the ciphertext is utilized. It can be used to calculate a right extended key at the last step based on stirred text at two given steps.

Ciphertext is obtained by accepting stirred text at a first step, estimating a parameter A at the first step by exhaustive search, estimating plaintext based on the parameter A and the stirred text, and encrypting the plaintext. A cryptanalysis condition relating to a higher order difference held between the cipher text and the stirred text is utilized. It can be used to calculate a right extended key at the last step based on stirred text at the first step and ciphertext. Furthermore, when it is adapted to MISTY with six rounds without the FL function, MISTY with six rounds without the FL function can be decrypted with $2^{39}$ of selected plaintext and the complexity of $2^{49}$ of the FO function.

Ciphertext is estimated by accepting stirred text at a first step, estimating a parameter A at the first step by exhaustive search, estimating plaintext based on the parameter A and the stirred text, and encrypting the plaintext. A cryptanalysis condition relating to a higher order difference held between the stirred text and stirred text at a second predetermined step estimated based on the ciphertext is utilized. It can be utilized to calculate a right extended key at the last step based on stirred text at the first step and unstirred text at a given step.

Ciphertext is estimated by accepting stirred text at a first step, estimating a parameter A at the first step by exhaustive search, estimating plaintext based on the parameter A and the stirred text, and encrypting the plaintext. A cryptanalysis condition relating to a higher order difference held between the stirred text and stirred text at the last-but-one step being the preceding step of the last step estimated based on the ciphertext is utilized. It can be utilized to calculate a right extended key at the last step based on stirred text at the first step and stirred text at the last-but-one step. Moreover, a right extended key at the last-but-one step can also be determined at which unstirred text at the last step is calculated. And, when it is adapted to MISTY1 with seven rounds without the FL function, MISTY1 with seven rounds without the FL function can be decrypted with $2^{39}$ of selected plaintext and the complexity of $2^{124}$ of the FO function.

In addition, with the use of plaintext properly selected that is suitable for decryption with higher order differences by stirred text at a predetermined step and satisfies a predetermined condition instead of utilizing the stirred text provided as described above, plain text can be used for decryption as a typical cryptanalysis of selected plaintext.

More specifically, ciphertext is obtained by accepting plaintext satisfying a predetermined condition, estimating stirred text at a predetermined step based on the plaintext, and encrypting the plaintext. A cryptanalysis condition relating to a higher order difference held between the cipher text and the stirred text is utilized. It can be used to calculate a right extended key at the last step based on stirred text at a given step and ciphertext.

In addition, the plaintext satisfying a predetermined condition described here is plaintext that is required from stirred text at a predetermined step to satisfy the predetermined condition.

Ciphertext is estimated by accepting plaintext satisfying a predetermined condition, estimating stirred text at a predetermined step based on the plaintext, and encrypting the plaintext. A cryptanalysis condition relating to a higher order difference held between the stirred text and unstirred text at a second predetermined step estimated based on the ciphertext is utilized. It can be used to calculate a right extended key at the last step based on stirred text at two given steps.

Ciphertext is estimated by accepting plaintext satisfying a predetermined condition, estimating a parameter A at a first step by exhaustive search, estimating stirred text at the first step based on the parameter A and the plaintext, and encrypting the plaintext. A cryptanalysis condition relating to a higher order difference held between the obtained ciphertext and the stirred text is utilized. It can be used to calculate a right extended key at the last step based on the stirred text at the first step and the ciphertext. Furthermore, particularly, MISTY with six rounds without the FL function can be decrypted with $2^{39}$ of selected plaintext and the complexity of $2^{49}$ of the FO function.

Ciphertext is estimated by accepting plaintext satisfying a predetermined condition, estimating a parameter A at a first step by exhaustive search, estimating stirred text at the first step based on the parameter A and the plaintext, and encrypting the plaintext. A cryptanalysis condition relating to a higher order difference held between the stirred text and unstirred text at a second predetermined step estimated based on the ciphertext is utilized. It can be used to calculate a right extended key at the last step based on stirred text at the first step and unstirred text at a given step.

Ciphertext is estimated by accepting plaintext satisfying a predetermined condition, estimating a parameter A at a first step by exhaustive search, estimating stirred text at the first step based on the parameter A and the plaintext, and encrypting the plaintext. A cryptanalysis condition relating to a higher order difference held between the stirred text and unstirred text at the last-but-one step being the preceding step of the last step estimated based on the ciphertext is utilized. It can be used to calculate a right extended key at the last step based on stirred text at the first step and stirred text at the last-but-one step. Moreover, an extended key at the last-but-one step can be determined at which unstirred text at the last step is calculated. In addition, MISTY1 with seven rounds without the FL function can be decrypted with $2^{39}$ of selected plaintext and the complexity of $2^{124}$ of the FO function.

REFERENCES

[1] S. Moriai, T. Shimoyama, T. Kaneko, "Higher Order Attack of a CAST Cipher", Fast Software Encryption 1998, FSE-4th, LNCS.1372. 1998.
[2] T. Shimoyama, S. Moriai, T. Kaneko and S. Tsuji, "Improved Higher Order Differential Attack and Its Application to Nyberg-Knudsen's Designed BlockCipher", IEICE TRANS. FUNDAMEN TALS, VOL.E82-A, NO__9 pp 1971-1980, 1999.
[3] M. Matsui, "New Block Encryption Algorithm MISTY," Fast Software Encryption 1997 FSE1997, pp 54-67, 1997.
[4] H. Tanaka, T. Kaneko, "An Attack of 6-round MISTY1 without FL functions", TECHMCAL REPORT OF IEICE, pp. 53-59, 2002.

BRIEF DESCRIPTION OF THE DRAWINGS

The teachings of the invention can be readily understood by considering the following detailed description in conjunction with the accompanying drawings, in which.

DESCRIPTION OF THE PREFERRED EMBODIMENT

Hereinafter, embodiments according to the invention will be described.

This cipher strength evaluation apparatus is configured to calculate an extended key at the last step of MISTY1, which is a Feistel block-cipher apparatus formed of six or seven stirring parts.

Figure 11:
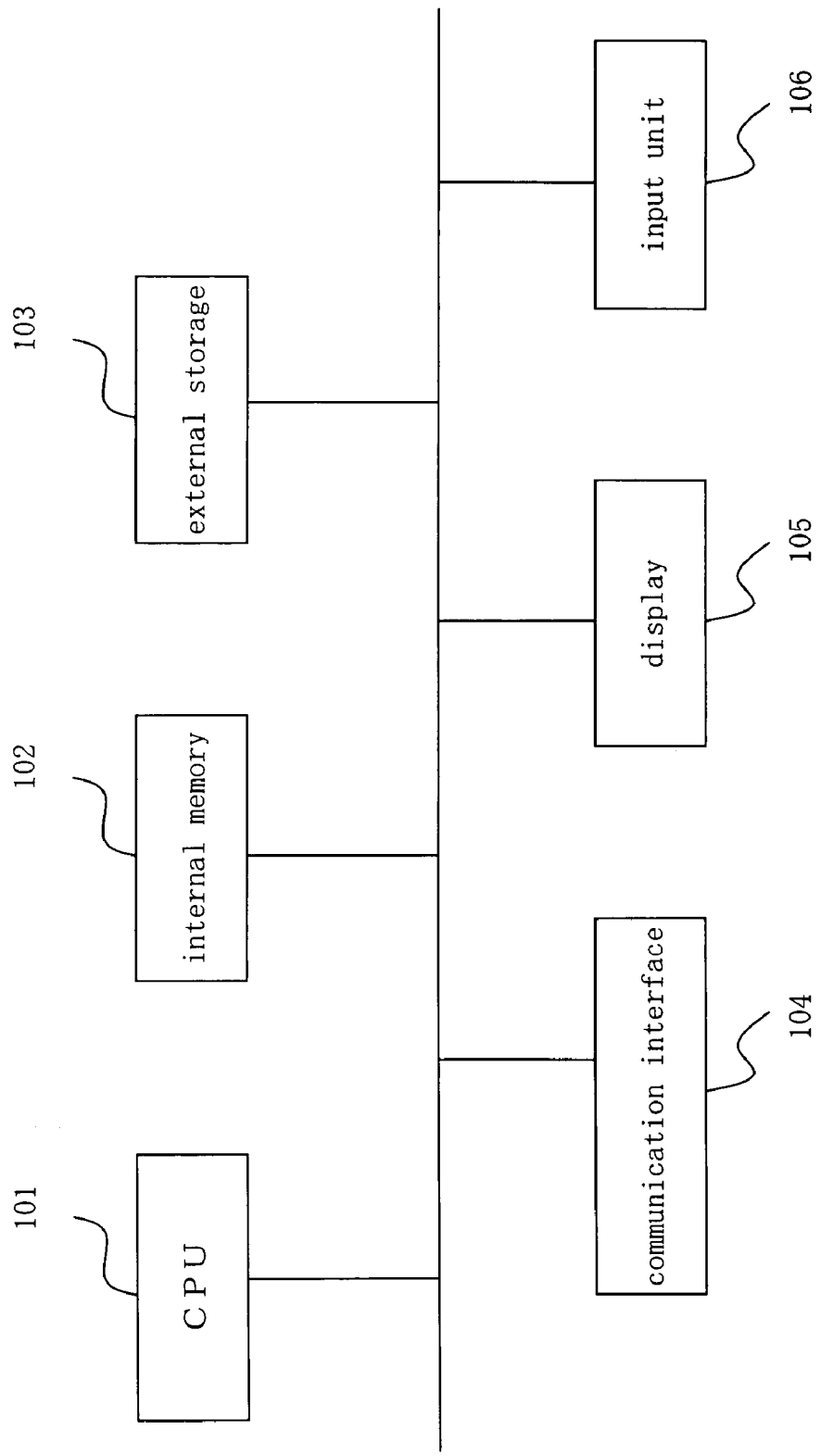
FIG. 11 is a hardware configuration diagram illustrating an embodiment according to the invention.

FIG. 11 is a device configuration diagram illustrating a cipher strength evaluation apparatus of this embodiment. As shown in FIG. 11 the cipher strength evaluation apparatus is a general purpose computer, for example, having a CPU 101, an internal memory 102, an external storage 103 such as HDD, a communication interface 104 such as a modem for connecting to communication networks, a display 105, and an input unit 106 such as a mouse and a keyboard.

Figure 12:
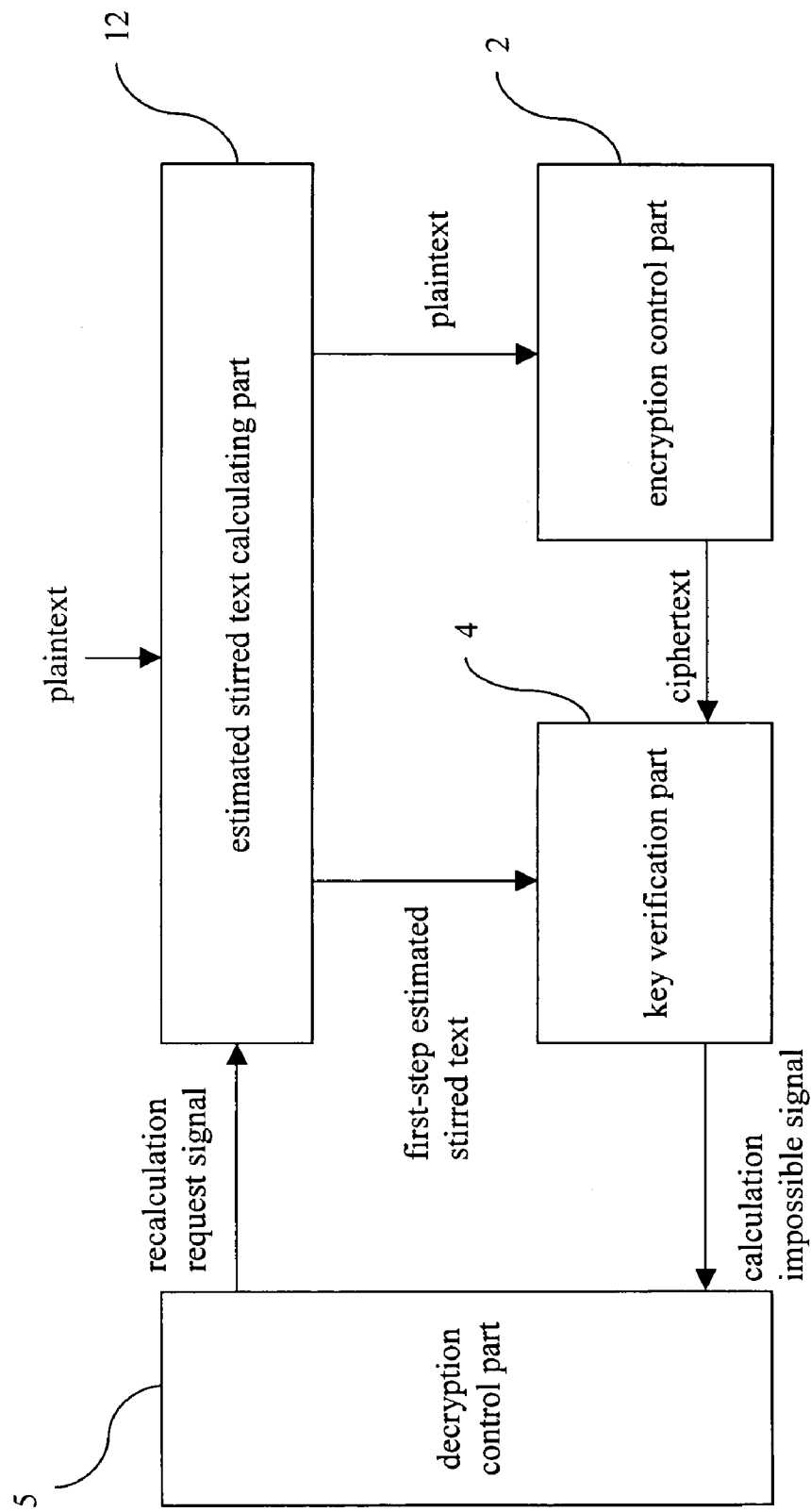
FIG. 12 is a function configuration diagram illustrating a particular plaintext detector of a first embodiment.
Figure 13:
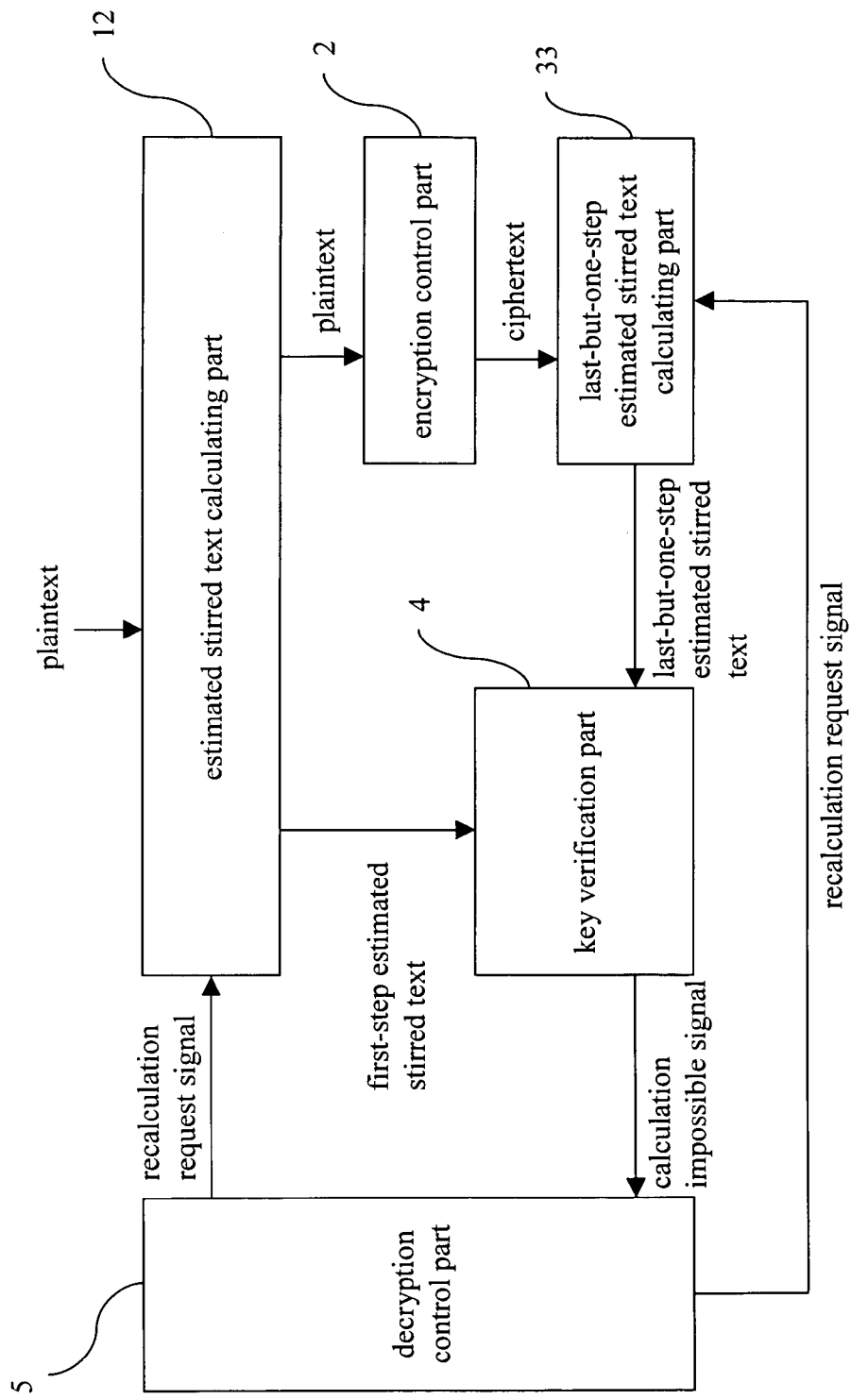
FIG. 13 is a function configuration diagram illustrating a particular plaintext detector of a second embodiment.

However, in the embodiment, as shown in FIG. 12 or 13, a predetermined program is installed in the computer and the CPU 101 and peripheral devices are operated together based on the program, which allows the apparatus to function as an estimated stirred text calculating part 12, an encryption control part 2, a last-but-one-step estimated stirred text calculating part 33, a key verification part 4, and a decryption control part 5.

The cipher strength evaluation apparatus is configured as a first embodiment shown in FIG. 12 to evaluate cipher strength on MISTY with six rounds, and it is configured as a second embodiment shown in FIG. 13 to evaluate cipher strength on MISTY with seven rounds.

Each of the parts will be briefly described below.

The estimated stirred text calculating part 12 as shown in FIGS. 6, 7, 8, 9, and 10 accepts plaintext satisfying a predetermined condition, calculates an estimated equivalent key estimated as an equivalent key determined from a first-step extended key being an extended key at a first step, and calculates first-step estimated stirred text satisfying a predetermined condition and estimated as stirred text at the first step based on the plaintext and the estimated equivalent key. With the use of the estimated stirred text calculating part 12 like this, the level-1 first-round elimination can be performed.

More specifically, the equivalent key described here is a value that an extended key is XOR-ed with a constant, and the extended key can be calculated easily from this value based on the known constant. A parameter that allows an extended key to be calculated by a simple logic operation with a known value like the equivalent key is called a parameter A in the application.

The estimated stirred text calculating part 12 allows stirred text at a given predetermined step to be calculated by estimating extended keys at a plurality of steps.

It is also possible to use an estimated plaintext calculating part 11 as shown in FIGS. 1, 2, 3, 4, and 5 for calculating plaintext from stirred text instead of the estimated stirred text calculating part 12 by the same operation as that of the estimated stirred text calculating part 12. Since the stirring parts of the Feistel encryption apparatus are shared to realize both functions of encryption and decryption, the estimated plaintext calculating part 11 has the same structure as that of the estimated stirred text calculating part 12.

The encryption control part 2 as shown in FIGS. 1, 2, 3, 4, 5, 6, 7, 8, 9, and 10 uses and allows the encryption apparatus to calculate ciphertext based on the plaintext accepted by the estimated stirred text calculating part 12. It directly or indirectly inputs plaintext into the encryption apparatus operating on the same computer as that on which the cipher strength evaluation apparatus operates or on another computer through a communication interface, and allows the encryption apparatus to calculate ciphertext corresponding to the plaintext. It is acceptable to be an apparatus that communicates with a storing part having plaintext and ciphertext corresponding to the plaintext stored therein and allows ciphertext to be calculated virtually.

Figure 5:
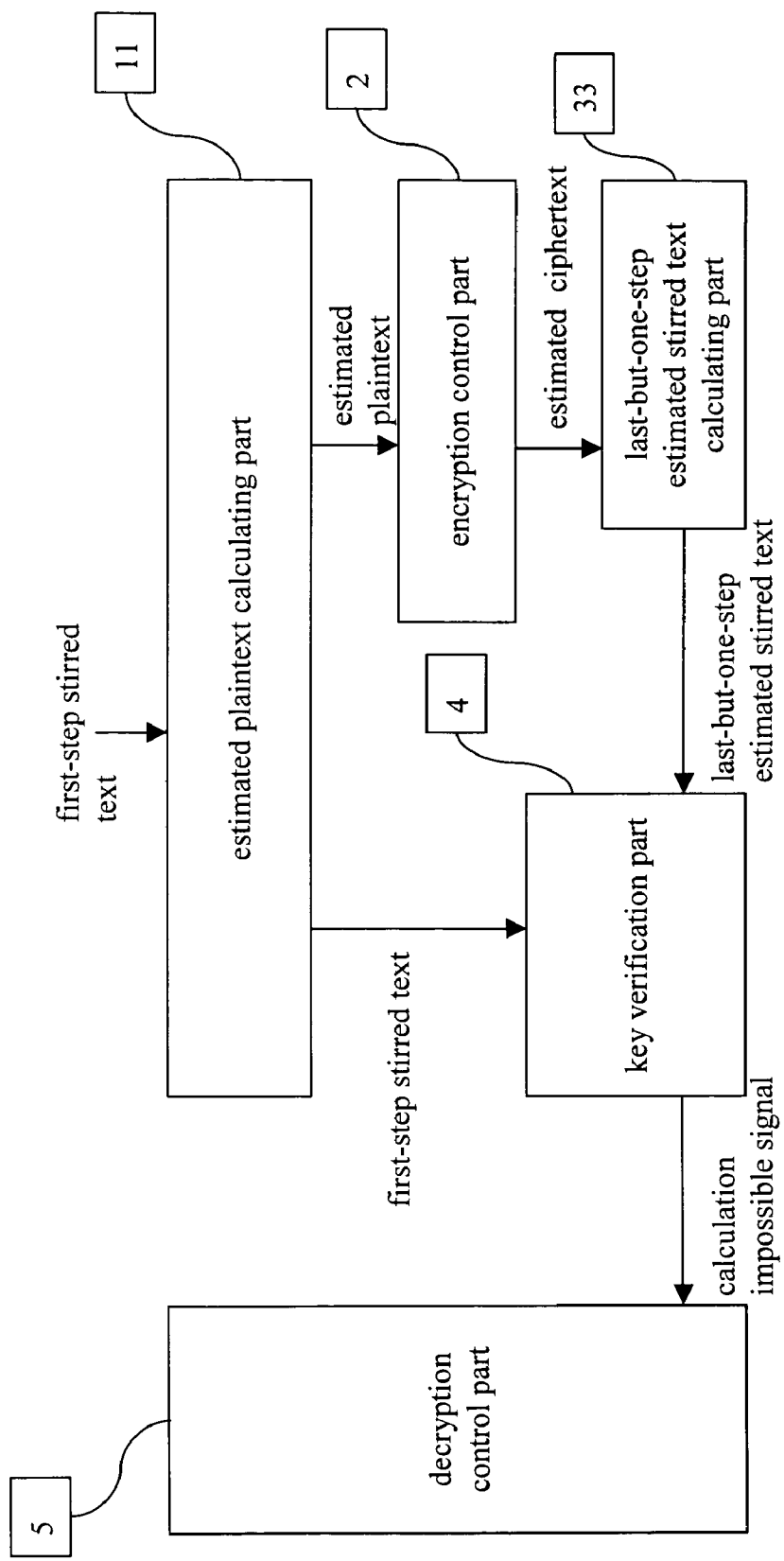
FIG. 5 is a function configuration diagram illustrating functions relating to an alternative embodiment of the invention.
Figure 6:
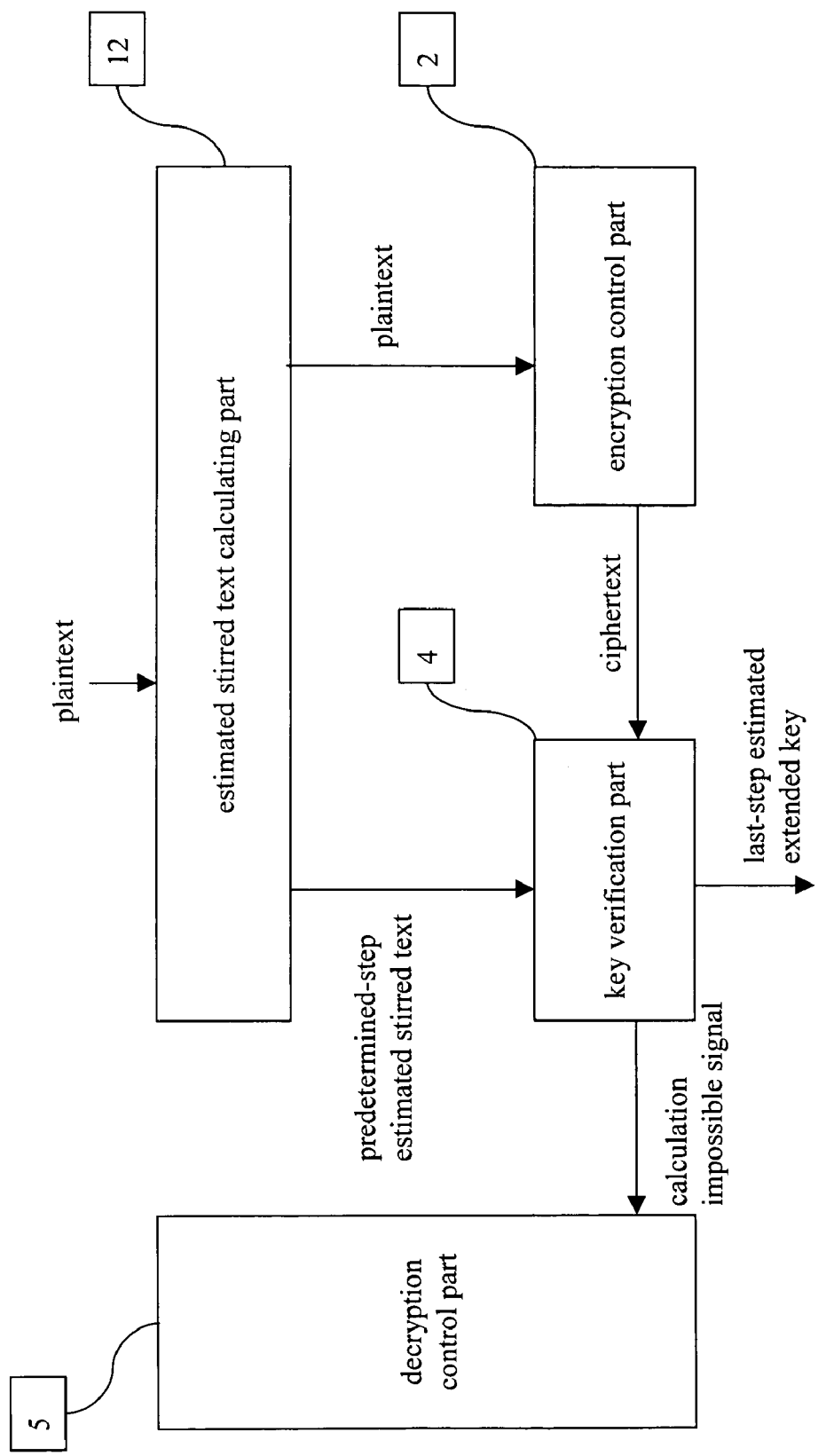
FIG. 6 is a function configuration diagram illustrating functions relating to an alternative embodiment of the invention.
Figure 10:
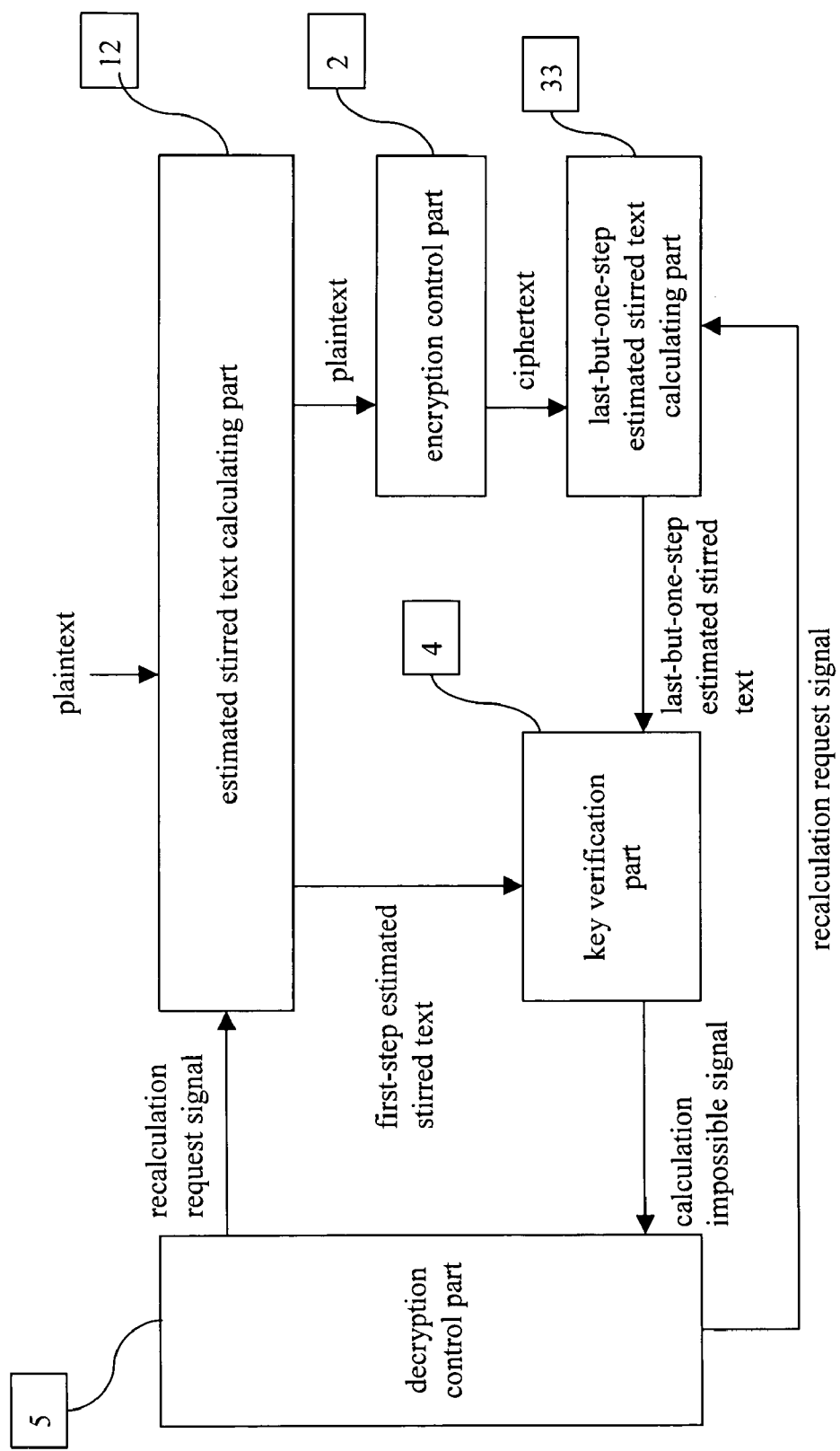
FIG. 10 is a function configuration diagram illustrating functions relating to an alternative embodiment of the invention.

The last-but-one-step estimated stirred text calculating part 33 as shown in FIGS. 5 and 10 accepts the ciphertext calculated by the encryption control part 2, calculates a last-step estimated extended key estimated as an extended key at the last step by exhaustive search, and calculates last-but-one-step estimated stirred text estimated as stirred text at the last-but-one step being the preceding step of the last step based on the ciphertext and the last-step estimated extended key. It estimates the last-step estimated extended key by exhaustive search on the equivalent key at the seventh step.

Figure 1:
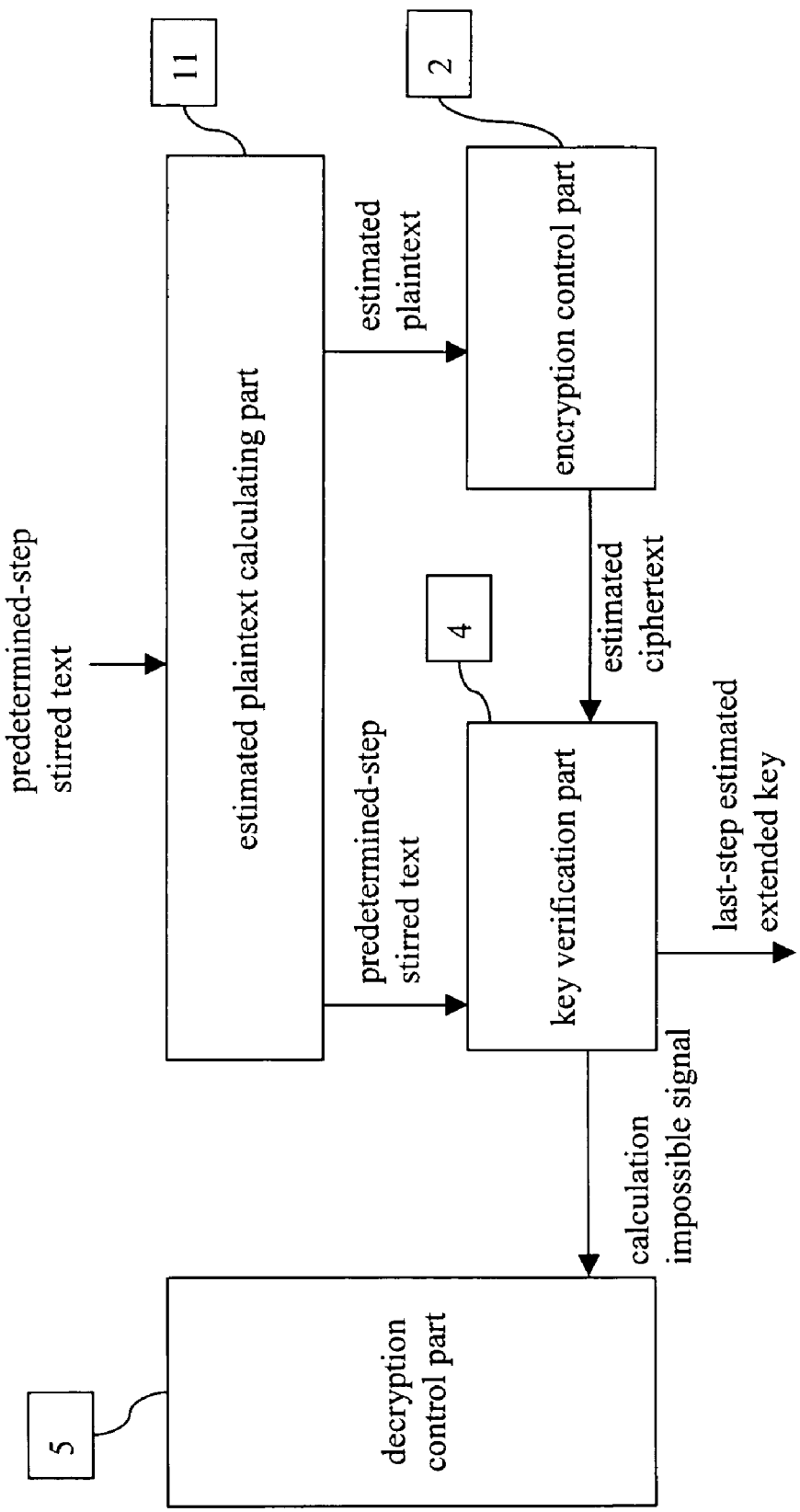
FIG. 1 is a function configuration diagram illustrating functions relating to an embodiment of the invention.
Figure 2:
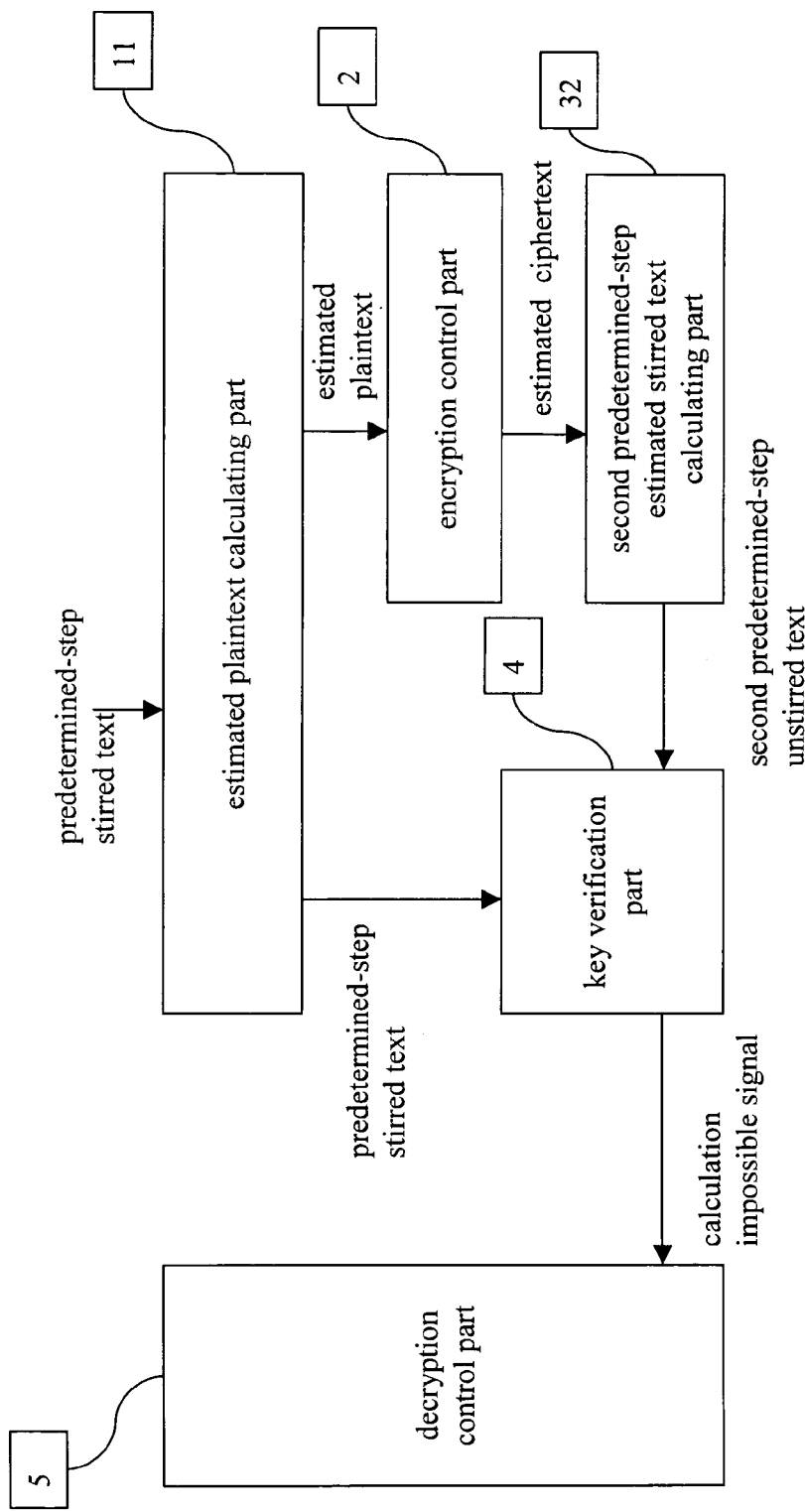
FIG. 2 is a function configuration diagram illustrating functions relating to an alternative embodiment of the invention.
Figure 3:
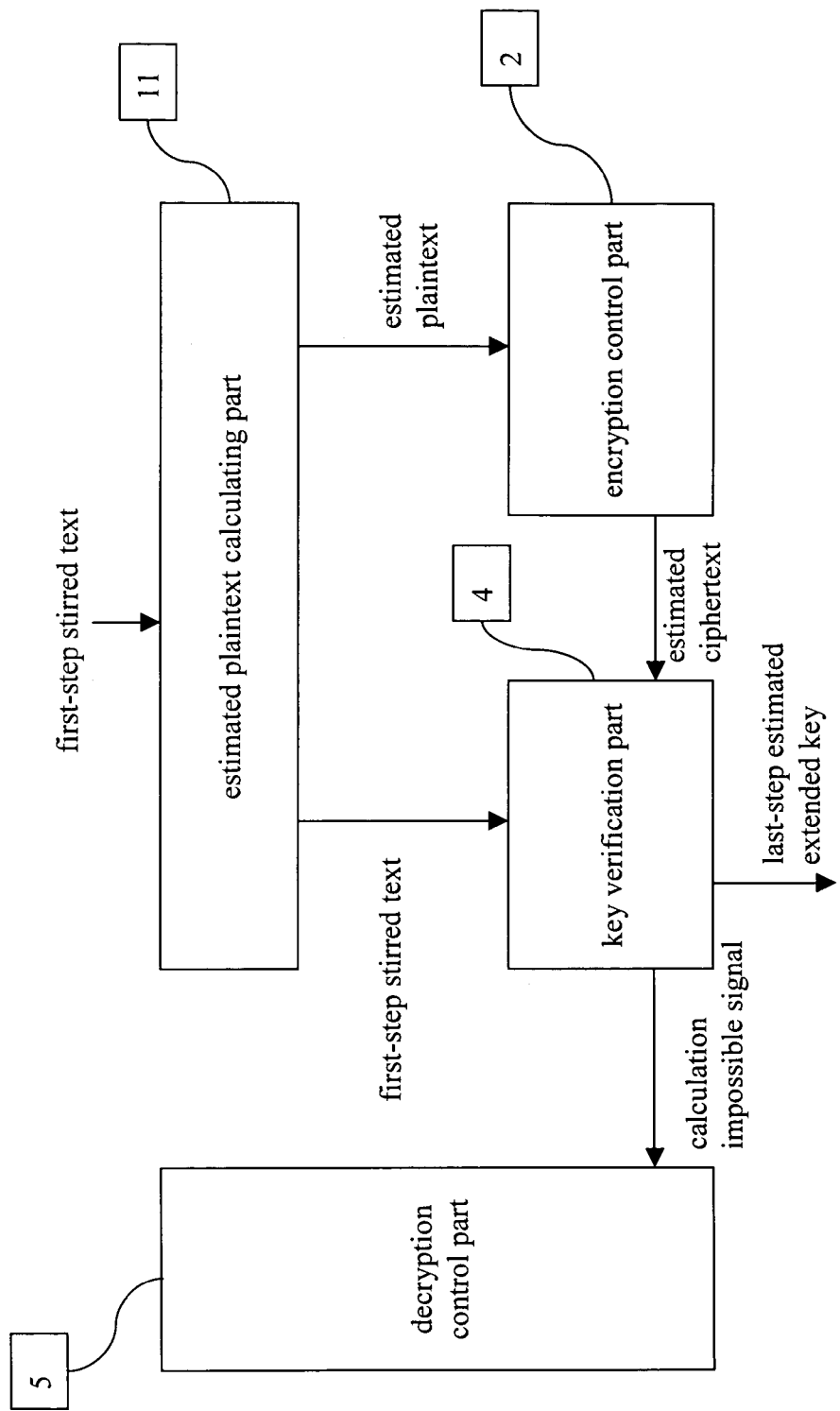
FIG. 3 is a function configuration diagram illustrating functions relating to an alternative embodiment of the invention.
Figure 4:
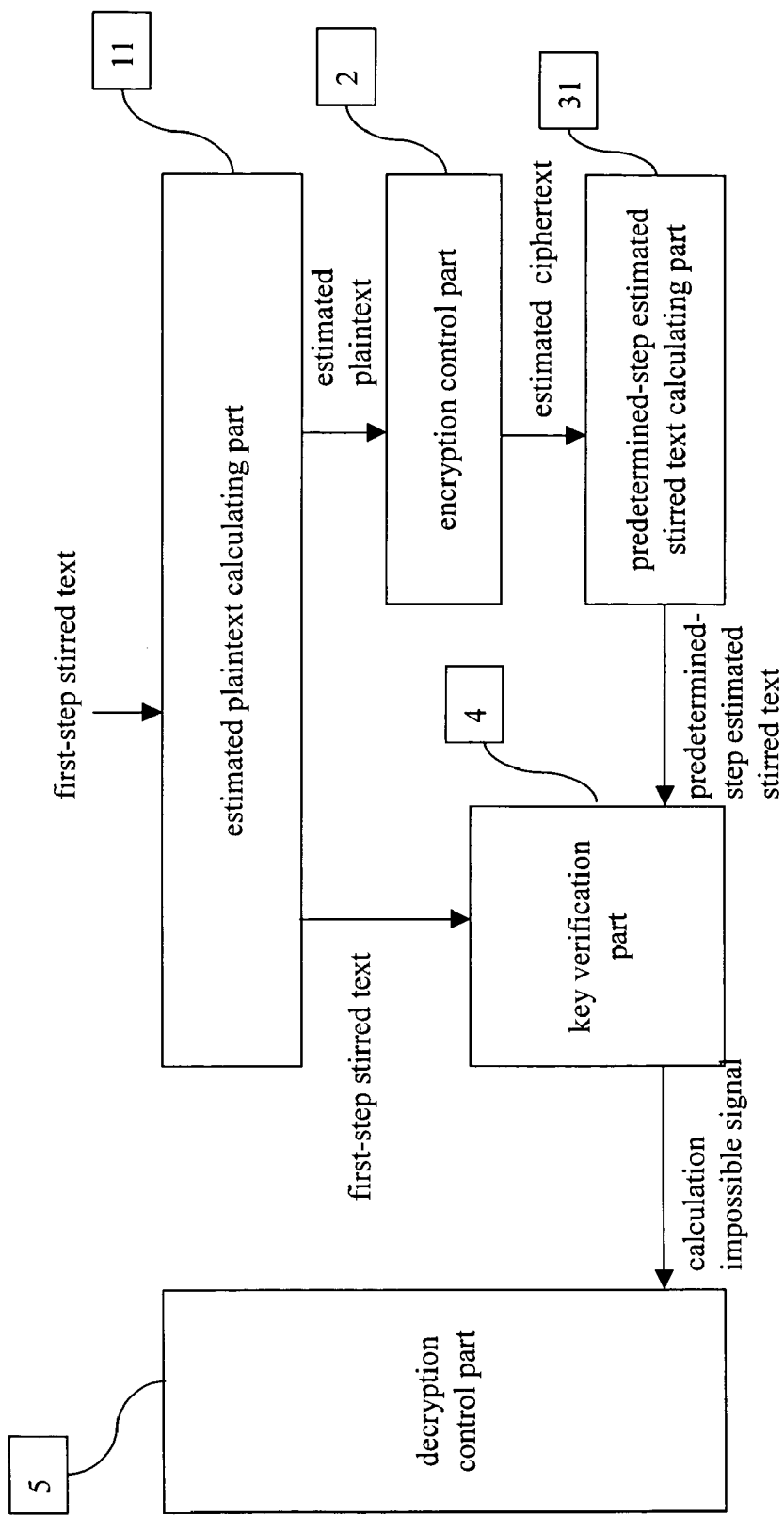
FIG. 4 is a function configuration diagram illustrating functions relating to an alternative embodiment of the invention.
Figure 7:
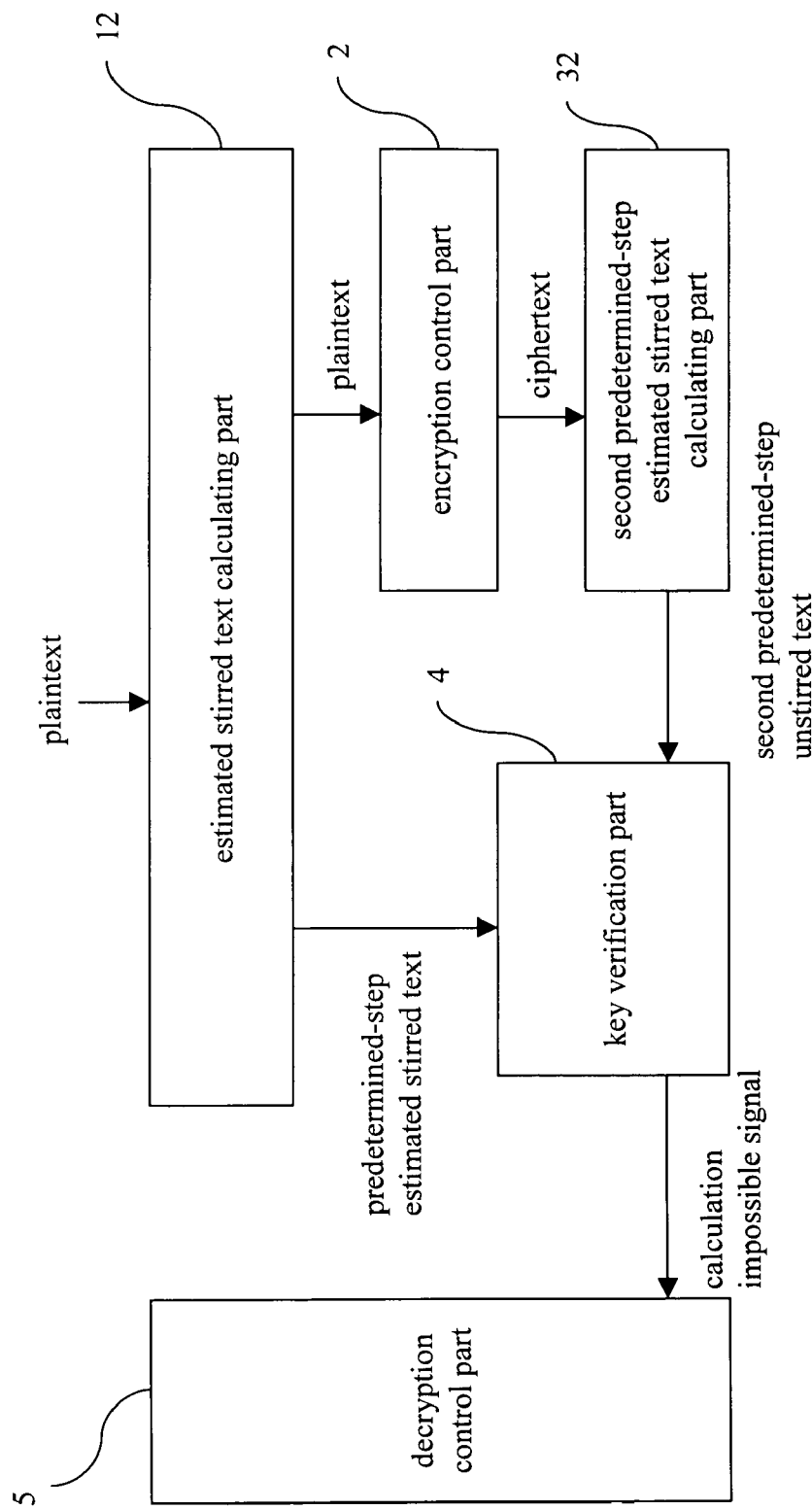
FIG. 7 is a function configuration diagram illustrating functions relating to an alternative embodiment of the invention.
Figure 8:
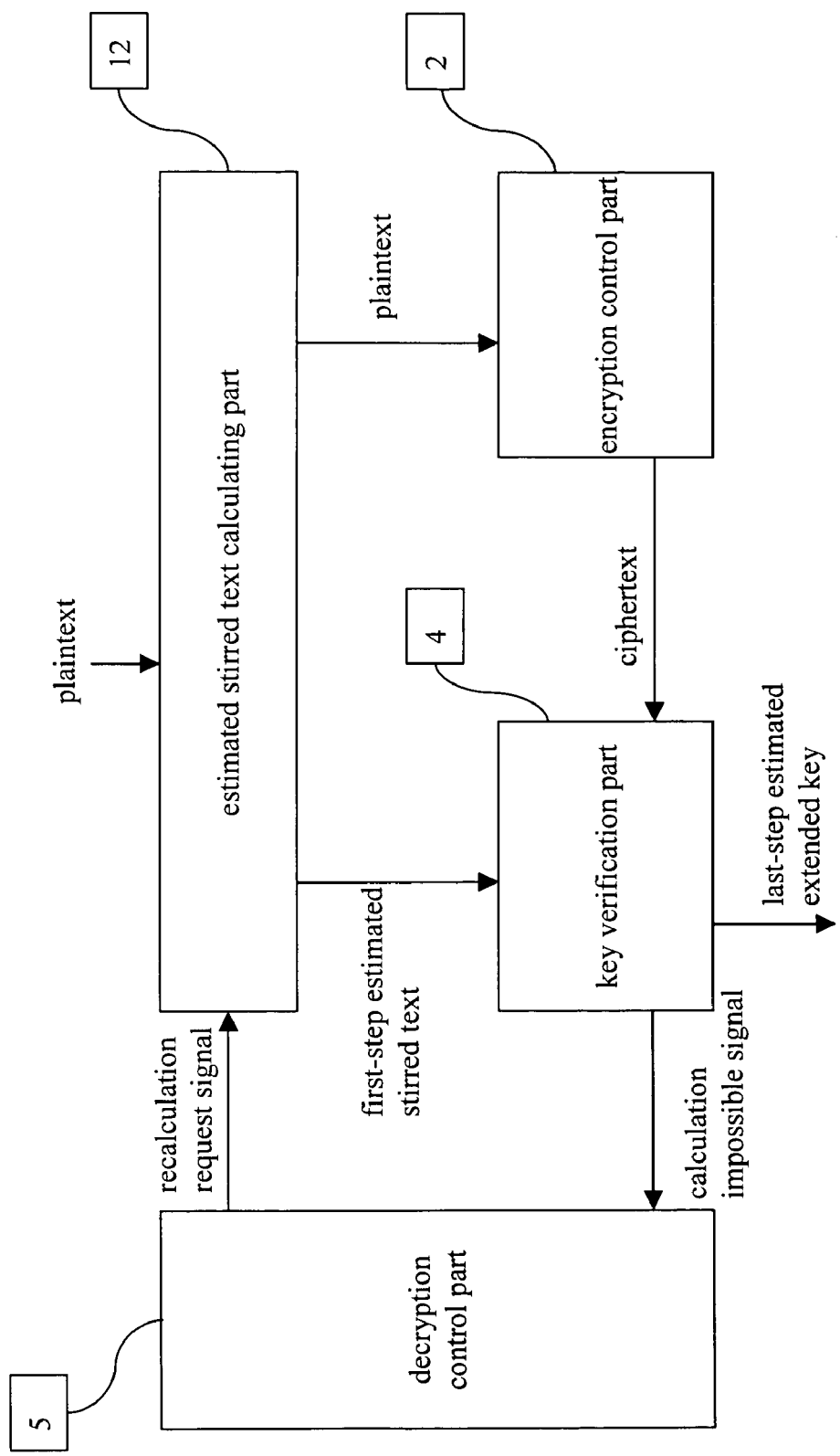
FIG. 8 is a function configuration diagram illustrating functions relating to an alternative embodiment of the invention.
Figure 9:
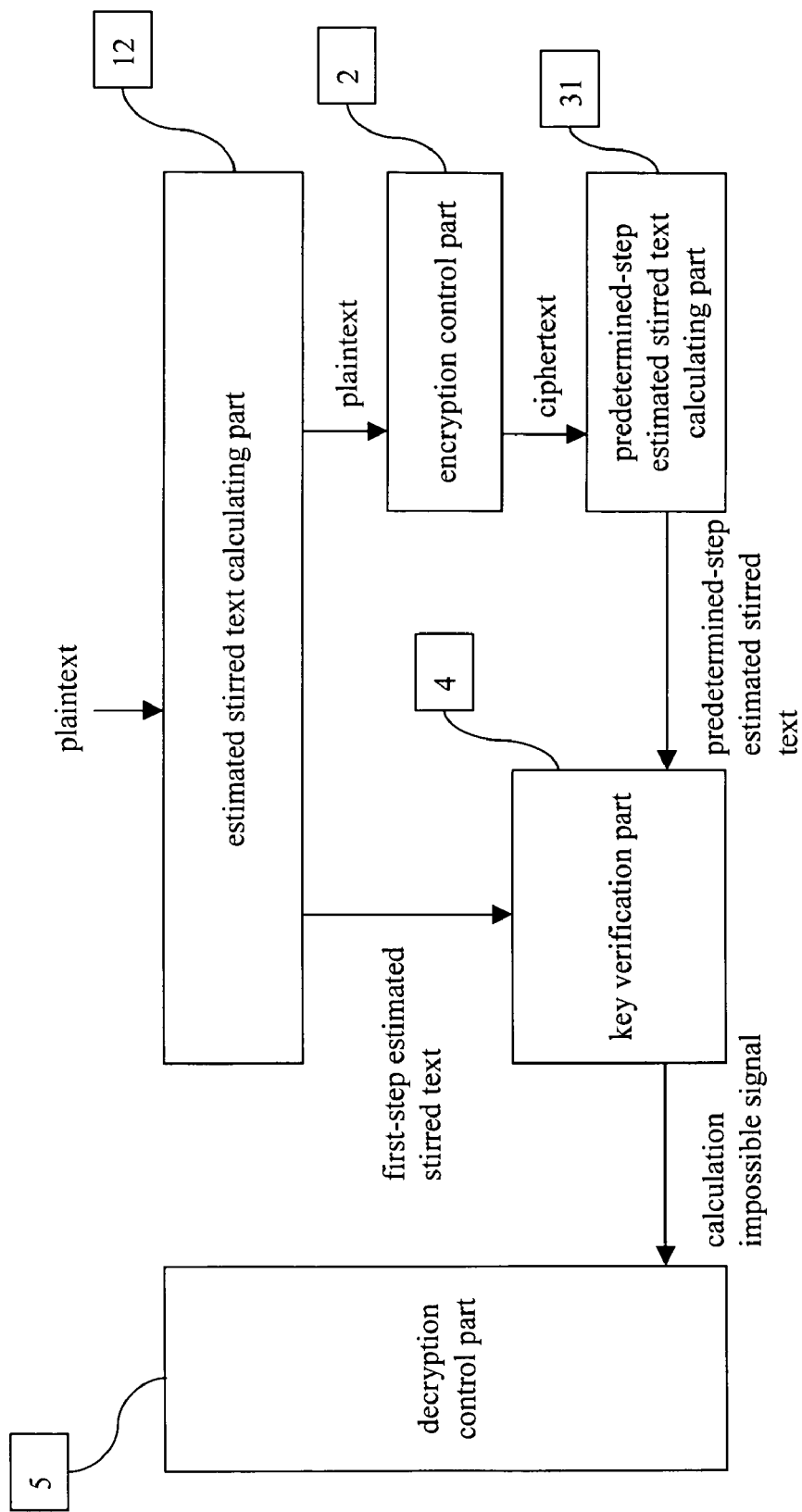
FIG. 9 is a function configuration diagram illustrating functions relating to an alternative embodiment of the invention.

Generally, the last-but-one-step estimated stirred text calculating part 33 can be formed to be a predetermined-step estimated stirred text calculating part 31 as shown in FIGS. 4 and 9 and a second predetermined-step estimated stirred text calculating part 32 as shown in FIGS. 2 and 7 for estimating extended keys at a plurality of steps, for example, to calculate stirred text at a given predetermined step.

The key verification part 4 as shown in FIGS. 1, 2, 3, 4, 5, 6, 7, 8, 9, and 10 formulates an encryption equation with higher order differences based on the first-step estimated stirred text accepted by the estimated stirred text calculating part 12 and ciphertext calculated under the control of the encryption control part 2 or based on the last-but-one-step estimated stirred text calculated by the last-but-one-step estimated stirred text calculating part 33, processes it by an algebraic technique to try to calculate a last-but-one-step extended key or last-step extended key, and outputs a calculation impossible signal when it detects that calculation is impossible.

The first embodiment is configured to try to calculate the last-step extended key based on first-step estimated stirred text and ciphertext. The second embodiment is configured to try to calculate the last-but-one-step extended key based on first-step estimated stirred text and the last-but-one-step estimated stirred text. In both cases, the right last-step extended key can be obtained with a fixed probability when it can be calculated. Then, the probability of obtaining the right last-step extended key is determined by redundancy provided for the encryption equation.

The decryption control part 5 as shown in FIGS. 1, 2, 3, 4, 5, 6, 7, 8, 9, and 10 accepts the calculation impossible signal, controls the estimated stirred text calculating part 12, estimated plaintext calculating part 11, the encryption control part 2, the last-but-one-step estimated stirred text calculating part 33, and/or the key verification part 4 to allow the key verification part 4 or the last-but-one-step estimated stirred text calculating part 33 to calculate the last-step extended key. The decryption control part 5 outputs a recalculation request signal for requesting to calculate an extended key until the extended key can be calculated, and then the estimated stirred text calculating part 12 or the estimated plaintext calculating part 11 and the last-but-one-step estimated stirred text calculating part 33 accept the calculation signal to recalculate each extended key.

In the second embodiment of evaluating cipher strength on MISTY with seven rounds, the last-but-one-step estimated stirred text calculating part 33 is added to the first embodiment of evaluating cipher strength on MISTY with six rounds formed of the estimated stirred text calculating part 12, the encryption control part 2, the key verification part 4, and the decryption control part 5.

The detailed description will be described below.

MISTY1 is a 64-bit common key block cipher, and the secret key length is 128 bits. The structure is Feistel in which key dependent linear transformation (FL function) is inserted into the odd steps and the last step. A round function (FO function) has nesting modified Feistel.

Figure 14:
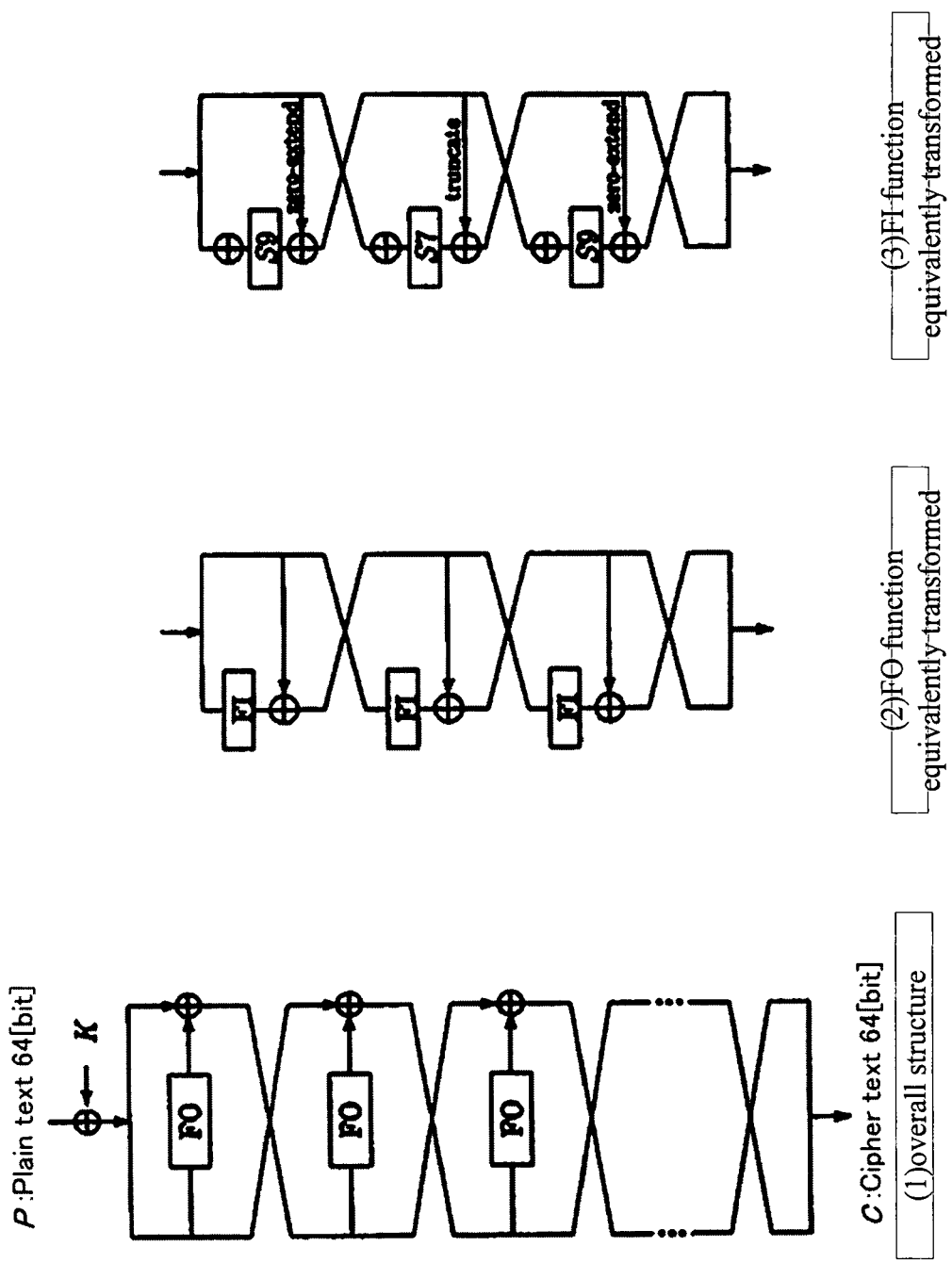
FIG. 14 is a diagram illustrating MISTY1 without the FL function.

The structure of MISTY1 without the FL function is shown in FIG. 14.

In the drawing, i expresses the index number of the FO function, j expresses the index number of the FI function, and K, Kij1, Kij2, and Kij3 express the equivalent keys. Hereinafter, MISTY1 without the FL function is simply called MISTY when it is not defined particularly.

Figure 15:
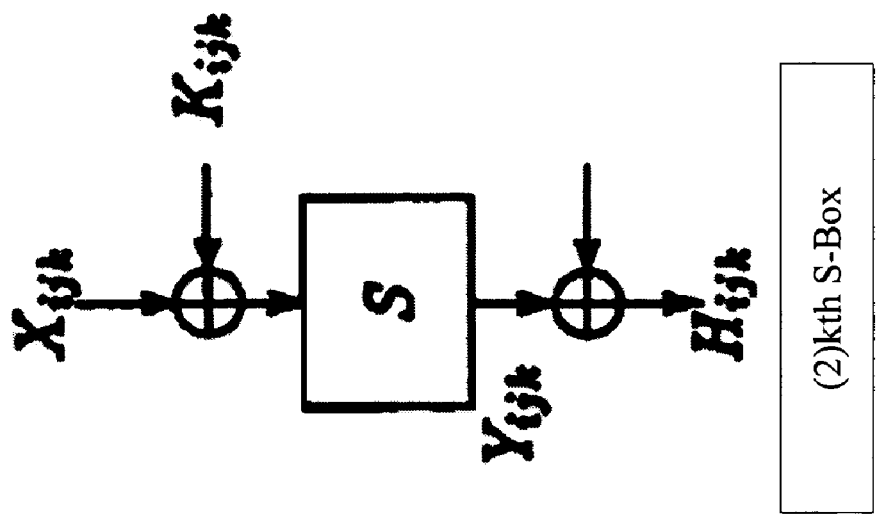
FIG. 15 is a diagram illustrating an $FI_{ij}$ function and the names of variables in a kth S-Box.
Figure 15:
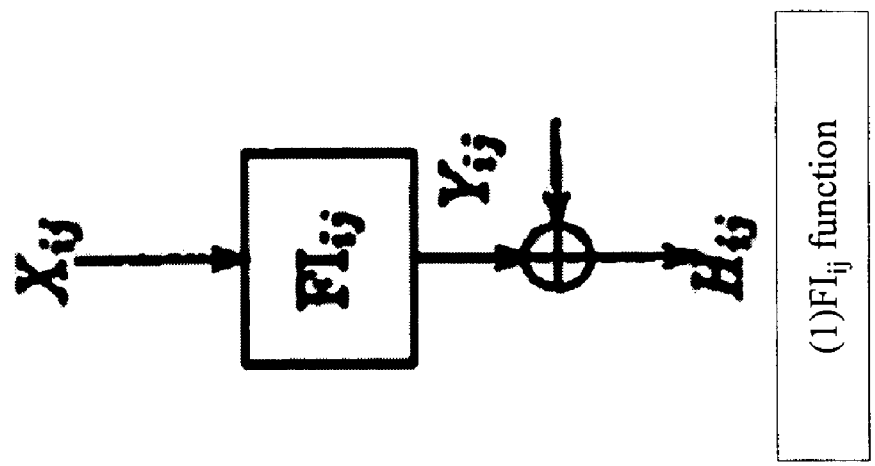

The definition of variables is as shown in FIG. 15. Furthermore, input 64 bits at the ith step is Pi; the left half of Pi is $P_{Li}$, and the right half is $P_{Ri}$.

Higher order differences will be described below. Let $F(X; K): GF(2)^n \times GF(2)^s \rightarrow GF(2)^m$ be a function below.

$$Y = F(X; K) \quad (1)$$

Here, $X \in GF(2)^n$ is input, $X \in GF(2)^s$ is a key, and $X \in GF(2)^m$ is output.

$\{A_1, A_2, \ldots, A_i\}$ is i vectors linearly independent on $GF(2)^n$. An i-dimensional subspace of $GF(2)^i$ spanned by this is expressed by $V^{(i)}$. The ith-order difference on X of the function $F(X;K)$ is defined by an equation below.

$$\Delta^{(i)}_{V^{(i)}} F(X; K) = \bigoplus_{A \in V^{(i)}} F(X \oplus A; K) \quad (2)$$

Hereinafter, $\Delta_{V^{(i)}}^{(i)}$ is abbreviated to $\Delta^{(i)}$, when $V^{(i)}$ does not need to be described clearly.

The higher order differences have the characteristic below.

$$deg_X\{F(X;K)\} = N \Rightarrow \begin{cases} \Delta^{(N+1)} F(X; K) = 0 \\ \Delta^{(N)} F(X; K) = \text{const} \end{cases} \quad (3)$$

Consider an encryption function $E_R$ with R steps. Output $H_{R-1}(X)$ at an R–1 step is expressed to input X as below.

$$H_{R-1}(X) = E_{R-1}(X; K_1, \ldots, K_{R-1}) \quad (4)$$

Here, $K_i$ is the extended key inputted at the ith step, $E_i(\cdot)$ is a function $GF(2)^n \times GF(2)^{s \times i} \to GF(2)^m$. An Equation below is held from Equation (3), where the order of $E_{R-1}(\cdot)$ to X is N order.

$$\Delta^{(N)} H_{R-1}(X) = \text{const} \quad (5)$$

In addition, the function to determine $H_{R-1}$ from ciphertext C is $\overline{E}(\cdot): GF(2)^n \times GF(2)^s \to GF(2)^m$.

$$H_{R-1}(X) = \overline{E}(C(X); K_R) \quad (6)$$

An equation below is held from Equations (5) and (6).

$$\text{const} = \Delta^{(N)} \overline{E}(C(X); K_R) \quad (7)$$

Equation (7) is always held when a key $K_R$ at the last step is right, and a cryptographer can determine the true key $K_R$. Hereinafter, Equation (7) is called an encryption equation.

An algebraic solution is a method that linearizes a higher-order term on a key contained in an attack equation by considering it as a linear term and determines the key with the algebraic technique. Hereinafter, the number of unknown coefficients on the key is expressed by L, and an algorithm of the algebraic solution follows References [1] and [2].

Equation (7) is re-expressed as below with matrix expression.

$$Ak = b \quad (8)$$

Here, A is m×L matrix, and b is an L-dimensional solution vector. In addition, k is an L-dimensional vector which linearizes terms on a key. From Equation (8), the true key $K_R$ can be determined from a linear equation obtained from L/m pairs of encryption equations with matrix calculation.

Next, consider the case where round robin is done on σ [bit] in the key $K_R$ and the rest is determined by the algebraic solution [11], where the number of unknown coefficients of a linear equation is L. At this time, the probability of a false key to survive is the probability of the linear equation not to be impossible, and an expected value p that is the number of false keys to survive to L+μ of encryption equations is $$p = 2^\sigma \times 2^{-\mu} \quad (9)$$

[4]. Therefore, L+μ of encryption equations satisfying p<<1 are prepared to allow the false keys to be eliminated.

Since there is m [bit] of encryption equations, m of linear equations can be obtained from a single pair of Nth-order differences. Thus, the number of Nth-order differences required for decryption to a pair of extended keys is $$Q = \left\lfloor \frac{L+\mu}{m} \right\rfloor \quad (10)$$

and the number of required plaintext is $M = 2^N \times Q$. Furthermore, the complexity includes σ [bit] of exhaustive search, and the algebraic solution is performed every time when a pair of extended keys is determined. Thus, the complexity required for attack is the complexity of the function of the complements of E in $$T = 2^\sigma \times 2^N \times (L+1) \times Q \quad (11)$$

[4].

Hereinafter, the decryption method of MISTY with fifth rounds with the seventh-order difference (higher order difference) is first described.

In MISTY, plaintext $P_1$ is separated into eight sub-blocks in accordance with input of S-Box.

$$P_1 = (X_7, X_6, X_5, X_4, X_3, X_2, X_1, X_0) \quad (12)$$

$$X_i \in \begin{cases} GF(2)^7, & i = \text{even} \\ GF(2)^9, & i = \text{odd} \end{cases}, (i = 0 \sim 7)$$

The selected plaintext that an increase in the algebraic order becomes slowest is determined as effective selected plaintext, and a selecting method of a variable sub-block to realize it is searched by formally estimating the algebraic order. Consequently, it is found that selected plaintext P* below is effective, where C is the fixed sub-block and X is the variable sub-block.

$$P^* = (C, C, C, C, C, C, C, X) \quad (13)$$

At this time, when is upper 7 [bit] of input $P_{L4}$ on the left at the fourth step, an equation below is shown as the result of analyzing this seventh-order difference.

$$\Delta^{(7)} P_{L4}{}^{L7} = 0x6D \quad (14)$$

Figure 16:
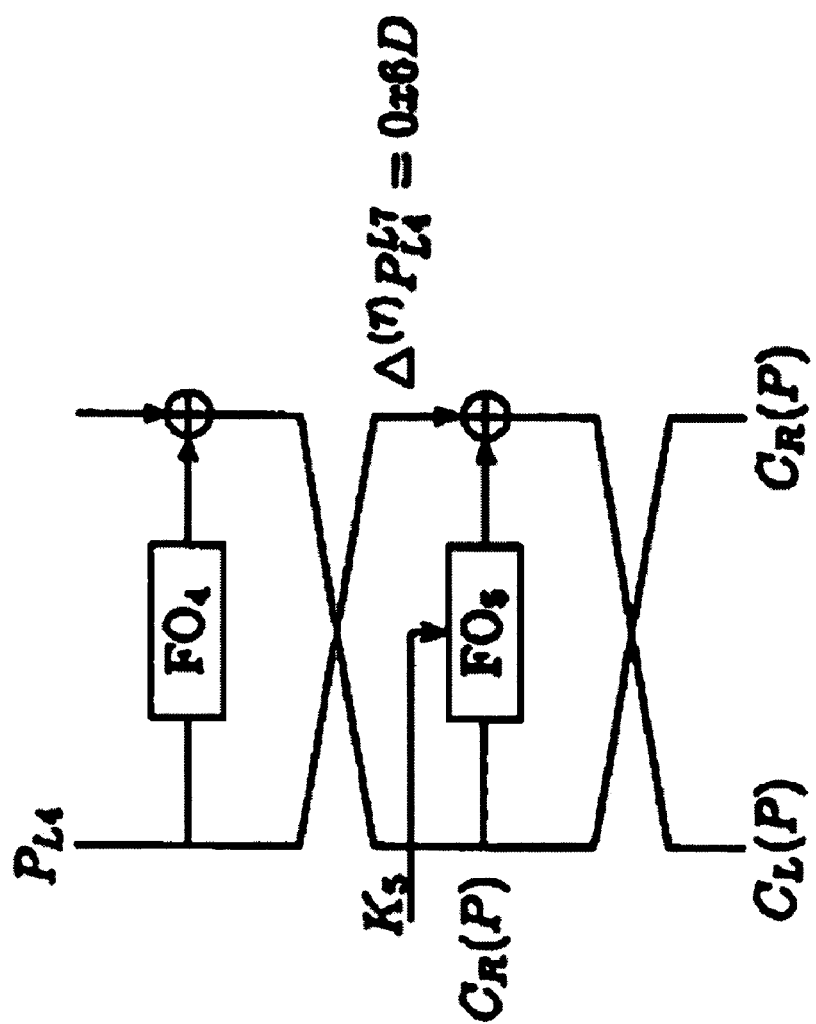
FIG. 16 is a diagram illustrating input/output variables at a fifth round.

FIG. 16 shows input/output variables at the fifth step. An encryption equation below is derived from FIG. 16 and Equation (7).

$$\Delta^{(N)}\{FO_5(C_R(P); K_5) \oplus C_L(P)\} = 0x6D \quad (15)$$

When an equivalent key at the fifth step is determined by the algebraic solution, there are L=74 of unknown coefficients in Equation (15). Consequently, MISTY with five rounds can be decrypted with $11 \times 2^7$ of selected plaintext and the complexity of $2^{17}$ of the FO function.

The decryption method of MISTY with five rounds is extended to allow MISTY at the sixth step to be decrypted.

More specifically, an equivalent key at the fifth step is determined by the algebraic solution as round robin is done on an equivalent key at the sixth step. Consequently, MISTY with six rounds can be attacked with $2^{12}$ of selected plaintext and the complexity of $2^{93}$ of the FO function.

The level-1 round elimination will be described below.

Input plaintext at the first step that input at the second step becomes P* is selected. At this time, an equation below is held, where is upper 7 [bit] of input $P_{L5}$ on the left at the fifth step.

$$\Delta^{(7)} P_{L5}{}^{L7} = 0x6D \quad (16)$$

Figure 17:
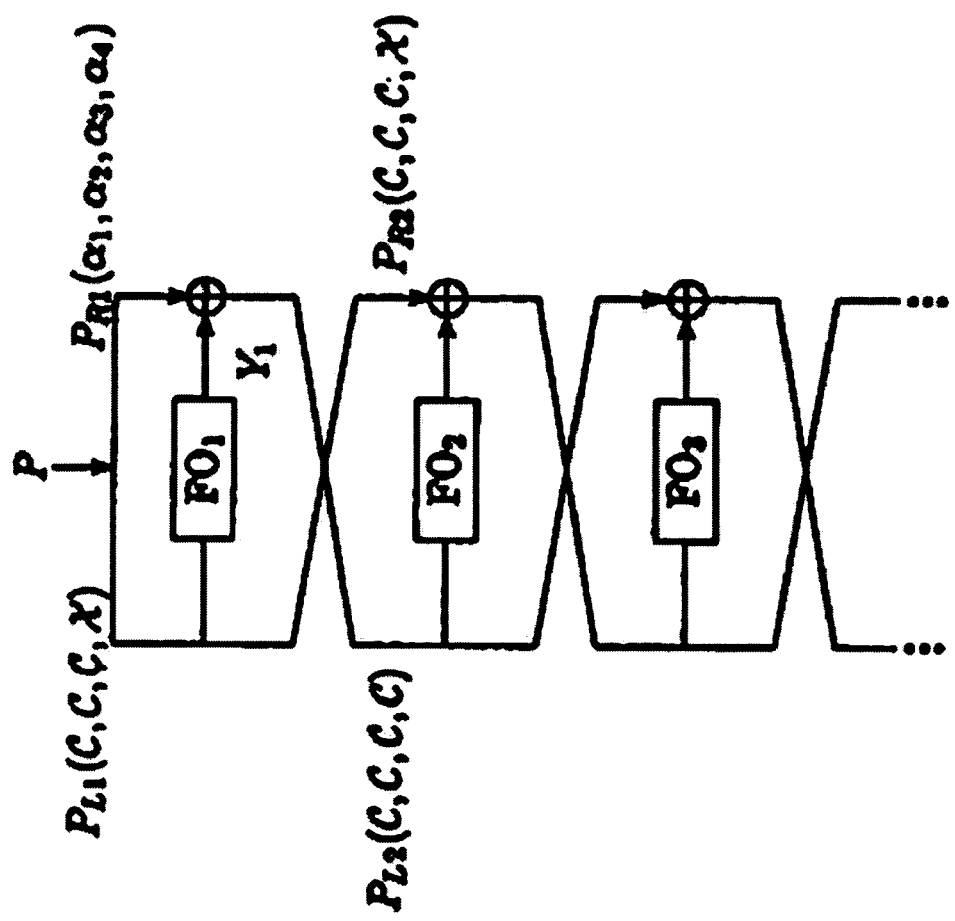
FIG. 17 is a diagram illustrating input of the first-round and the second-round of MISTY

From FIG. 17, input $P_{L1}$ the left half at the first step is equal to input $P_{R2}$ the right half at the second step. Furthermore, output of an $FO_1$ function is $Y_1$, and is expressed as below in accordance with the output of S-Box.

$$Y_1 = (y_{11}, y^{12}, y_{13}, y_{14})$$

$$y_{11}, y_{13} \in GF(2)^7, y_{12}, y_{14} \in GF(2)^9 \quad (17)$$

At this time, when $X \in GF(2)^7$ is transformed, $y_{11}$, $y_{12}$, $y_{13}$, and $y_{14}$ are described as below.

$$\begin{cases} y_{11} = S7(X \oplus K_{122}) \oplus X \oplus c_1 \\ y_{12} = S7(X \oplus K_{122}) \oplus S9(X \oplus c_2) \oplus c_3 \\ y_{13} = S7(X \oplus K_{122}) \oplus S7(X \oplus c_4) \oplus c_5 \\ y_{14} = S7(X \oplus K_{122}) \oplus S7(X \oplus c_4) \\ \quad \oplus S9(X \oplus c_2) \oplus S9(X \oplus c_6) \oplus X \oplus c_7 \end{cases} \quad (18)$$

$$c_1, c_4, c_5, K_{122} \in GF(2)^7, c_2, c_3, c_6, c_7 \in GF(2)^9$$

Operations having different bit widths follow the algorithm of MISTY [3]. (0 is added to upper 2 [bit] in transformation from 7 [bit] to 9 [bit], and upper 2 [bit] is rounded down in transformation from 7 [bit] to 9 [bit].) Here, $C_i$ (i=1 to 7) is a constant determined from the fixed value of plaintext and the equivalent key at the first step. $P_{R1}$ can be determined as below, where $c'_i$ (i=1 to 4) is a given constant.

$$P_{R1} = (\alpha_1, \alpha_2, \alpha_3, \alpha_4)$$

$$\alpha_i = y_{1i} \oplus c'_i (i=1 \sim 4) \quad (19)$$

In the Equation above, since $c_1$, $c_3$, $c_5$, and $C_7$ are a constant and can be considered to be the fixed value of plaintext, they do not need to be estimated. Therefore, an equivalent key $K_{122}$ and $C_2$, $C_4$, and $c_6$ have to be estimated, and the number of the total bits is 32 [bit]. When these values can be estimated right, an XOR of $P_{R1}$ and $Y_1$ becomes input $P_{L2}$=(C, C, C, C) the left half at the second step. Thus, since the input $P_2$ at the second step becomes P* and Equation (16) is held, an encryption equation below for determining an equivalent key at the sixth step can be derived.

$$\Delta^{(7)} \{FO_6(C_R(P); K_6) \oplus C_L(P)\} = 0x6D \quad (20)$$

In the level-1 first-round elimination, new selected plaintext needs to be prepared when the estimated value at the first step is wrong. Here, a set Q of the seventh-order difference required for decryption is 1, the estimated value at the first step is 32 [bit]. Thus, $2^{32}$ of seventh-order differences are needed in total. When Encryption equation (20) is derived with the seventh-order differences, $2^7$ of selected plaintext is required to derive a single encryption equation. Therefore, at least $M=2^{32} \times 2^7 = 2^{39}$ of selected plaintext is required in this decryption.

Here, consider the fixed value of P* of plaintext. When the fixed sub-block of $P_{R2}$ is a given constant (0, for example) and only $P_{L2}$ is varied, input $P_2$ at the second step can take $2^{32}$ of seventh-order differences. The fixed value of P* of plaintext can be set by $c'_i$ (i=1 to 4) in Equation (19) in the level-1 first-round elimination. As described above, in the case where $Q \leq 2^{32}$ of seventh-order differences are required, at least about $M=2^{39}$ of plaintext is prepared to allow input plaintext to be shared for use in this decryption. Thus, $M=2^{39}$ of required selected plaintext is sufficient.

Figure 18:
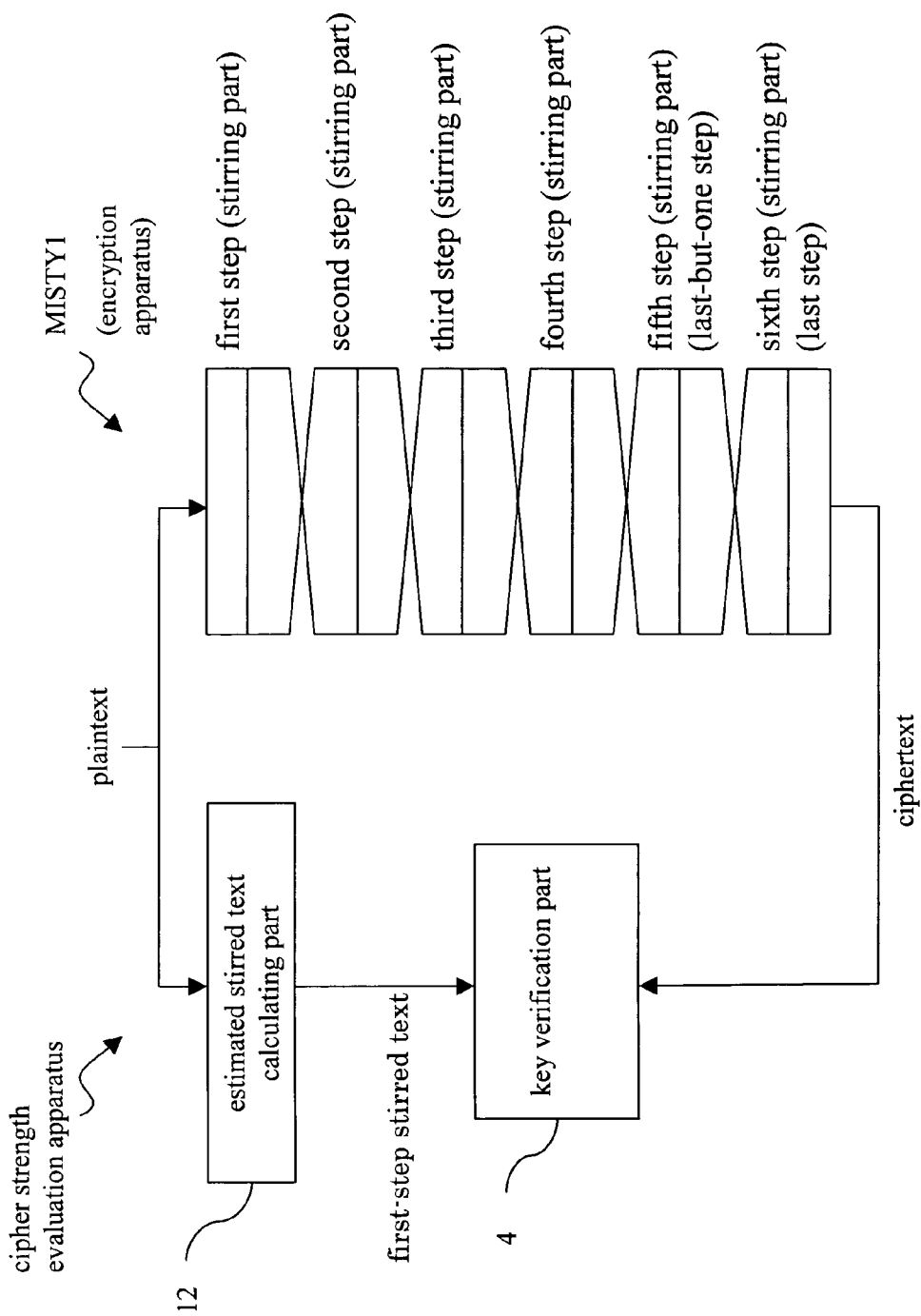
FIG. 18 is a diagram illustrating the operation image of the particular plaintext detector of the first embodiment.

Next, an example will be shown below in which the level-1 first-round elimination with the estimated stirred text calculating part 12 is applied to decrypting MISTY with fifth rounds to decrypt MISTY with six rounds in accordance with the first embodiment with reference to FIG. 18.

The key verification part 4 uses the algebraic solution to determine an equivalent key at the six step to a pair of the estimated values of $K_{122}$ and $c_2$, $c_4$ and $c_6$ in Equation (18) estimated by the estimated stirred text calculating part 12. At this time, the ciphertext calculated by the encryption apparatus under the control of the encryption control part 2 is used. Since the number of the total bits that the estimated stirred text calculating part 12 has to estimate at the first step is σ=32, the expected value that false keys survive becomes $$p = 2^{32} \times 2^{-\mu} \quad (21)$$

from Equation (9). The number of unknowns included in the encryption equation of decryption at the fifth step is L=74. Here, μ=σ+1=33 where μ satisfying p<1 is set for the first time, and the seventh-order difference pair Q required from the key verification part 4 in this decryption becomes $$Q = \left\lfloor \frac{L+\mu}{m} \right\rfloor = \left\lfloor \frac{74+33}{7} \right\rfloor = 16 \quad (22)$$

from Equation (10). The seventh-order difference pairs derived from the Equation are required, but $M=2^{39}$ of required selected plaintext is sufficient because plaintext is shared for use.

Furthermore, the required complexity of the FO function becomes $$T = 2^\sigma \times 2^N \times (L+1) \times Q = 2^{39} \times 75 \times 16 \leq 2^{49} \quad (23)$$

from Equation (11). Therefore, $2^{39}$ of selected plaintext and the complexity of $2^{49}$ of the FO function allow the ciphertext of MISTY with six rounds to be decrypted.

Figure 19:
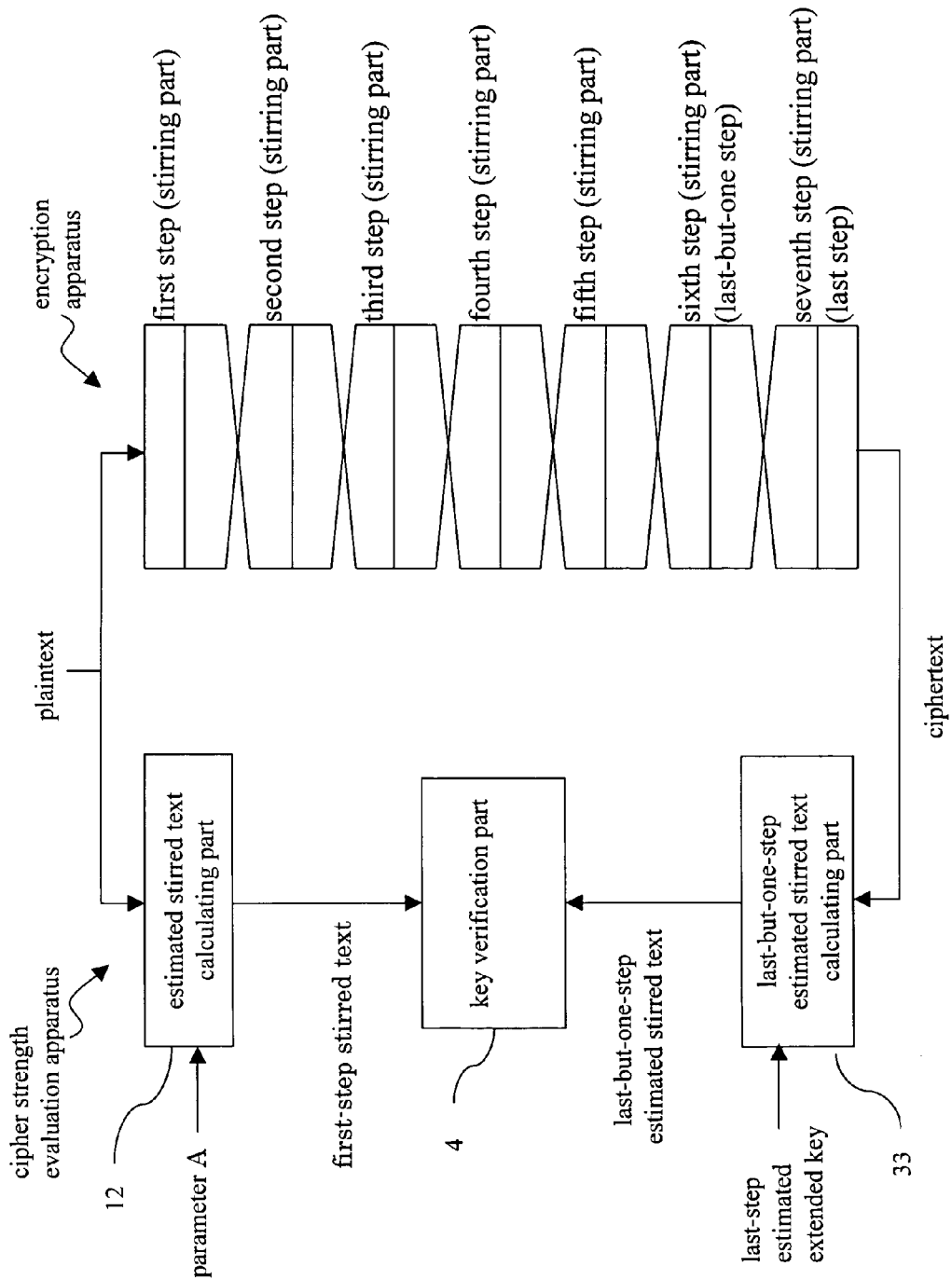
FIG. 19 is a diagram illustrating the operation image of the particular plaintext detector of the second embodiment.

An example will be shown below in which an equivalent key at the seventh round undergoes exhaustive search to decrypt MISTY with seven rounds in accordance with the second embodiment with reference to FIG. 19.

The number of the total bits that the last-but-one-step estimated stirred text calculating part 33 newly added has to calculate in an $FO_7$ function is 75 [bit], and the number of the total bits that the estimated stirred text calculating part 12 has to calculate at the first step is 32 [bit]. Thus, σ=75+32=107. The expected value that false keys survive becomes $$p = 2^{107} \times 2^{-\mu} \quad (24)$$

from Equation (9). Here, μ=σ−1=108 where μ satisfying p<1 is set for the first time, and the seventh-order difference pair Q required in this attack becomes $$Q = \left\lfloor \frac{L+\mu}{m} \right\rfloor = \left\lfloor \frac{74+108}{7} \right\rfloor = 26 \quad (25)$$

from Equation (10). The seventh-order difference pairs derived from the Equation are required, but the number of required selected plaintext is $M=2^{39}$.

Furthermore, the complexity of the FO function required for decryption becomes $$T = 2^0 \times 2^N \times (L+1) \times Q \quad (26)$$
$$= 2^{114} \times 75 \times 26 \leq 2^{124}$$

from Equation (11). Therefore, $2^{39}$ of selected plaintext and the complexity of $2^{124}$ of the FO function allow the ciphertext of MISTY with seven rounds to be decrypted.

Figure 20:
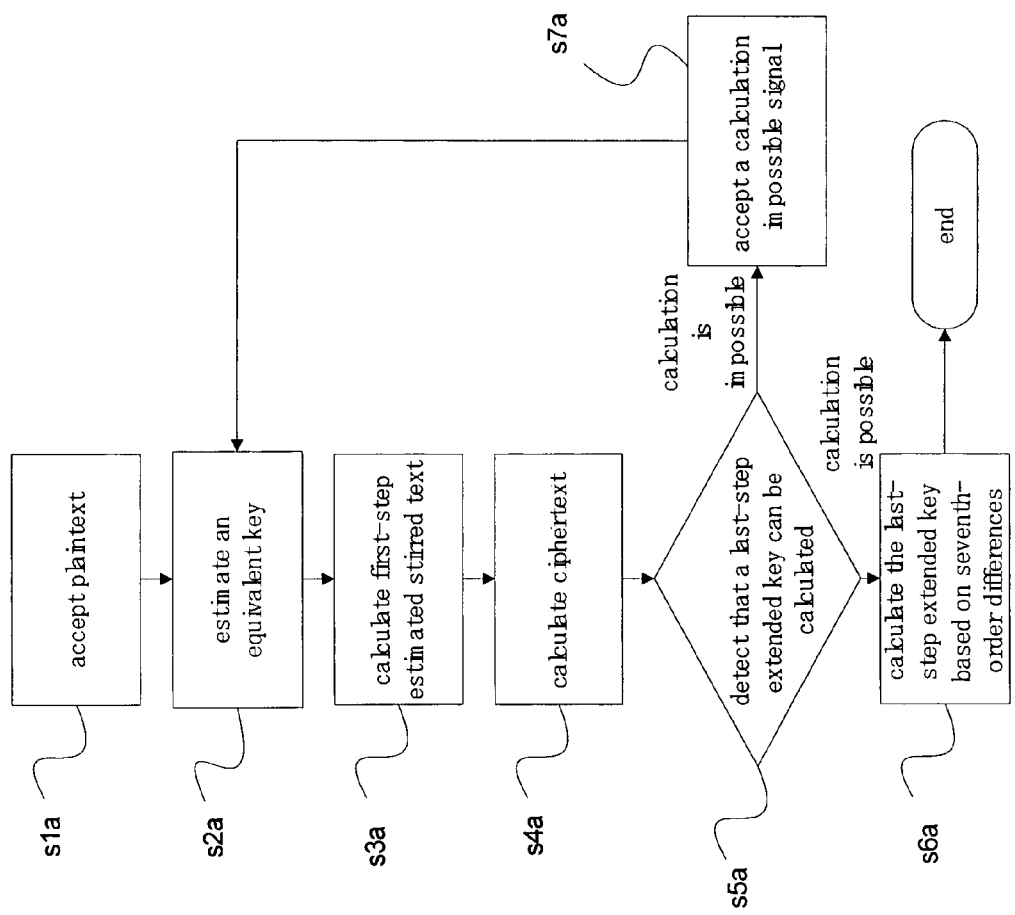
FIG. 20 is a flowchart illustrating an example of the operation of the first embodiment.

Next, the operation of the first embodiment of the cipher strength evaluation apparatus will be described below with reference to the flowchart shown in FIG. 20.

First, the estimated stirred text calculating part 12 accepts plaintext satisfying a predetermined condition (s1a).

The estimated stirred text calculating part 12 estimates an equivalent key by exhaustive search (s2a).

The estimated stirred text calculating part 12 calculates first-step estimated stirred text based on the equivalent key having been estimated (s3a).

Ciphertext is calculated under the control of the encryption control apparatus 2 based on the plaintext (s4a).

The key verification part 4 calculates a last-step extended key when it detects that the last-step extended key can be calculated, and it outputs a calculation impossible signal when it detects that the last-step extended key cannot be calculated (s5a). It calculates the last-step extended key (s6a) to end.

When the decryption control part 5 accepts the calculation impossible signal (s7a), it outputs a recalculation request signal. The estimated stirred text calculating part 12 accepts the recalculation request signal and recalculates an equivalent key (s2a).

In accordance with the procedures, the right last-step extended key is calculated.

Figure 21:
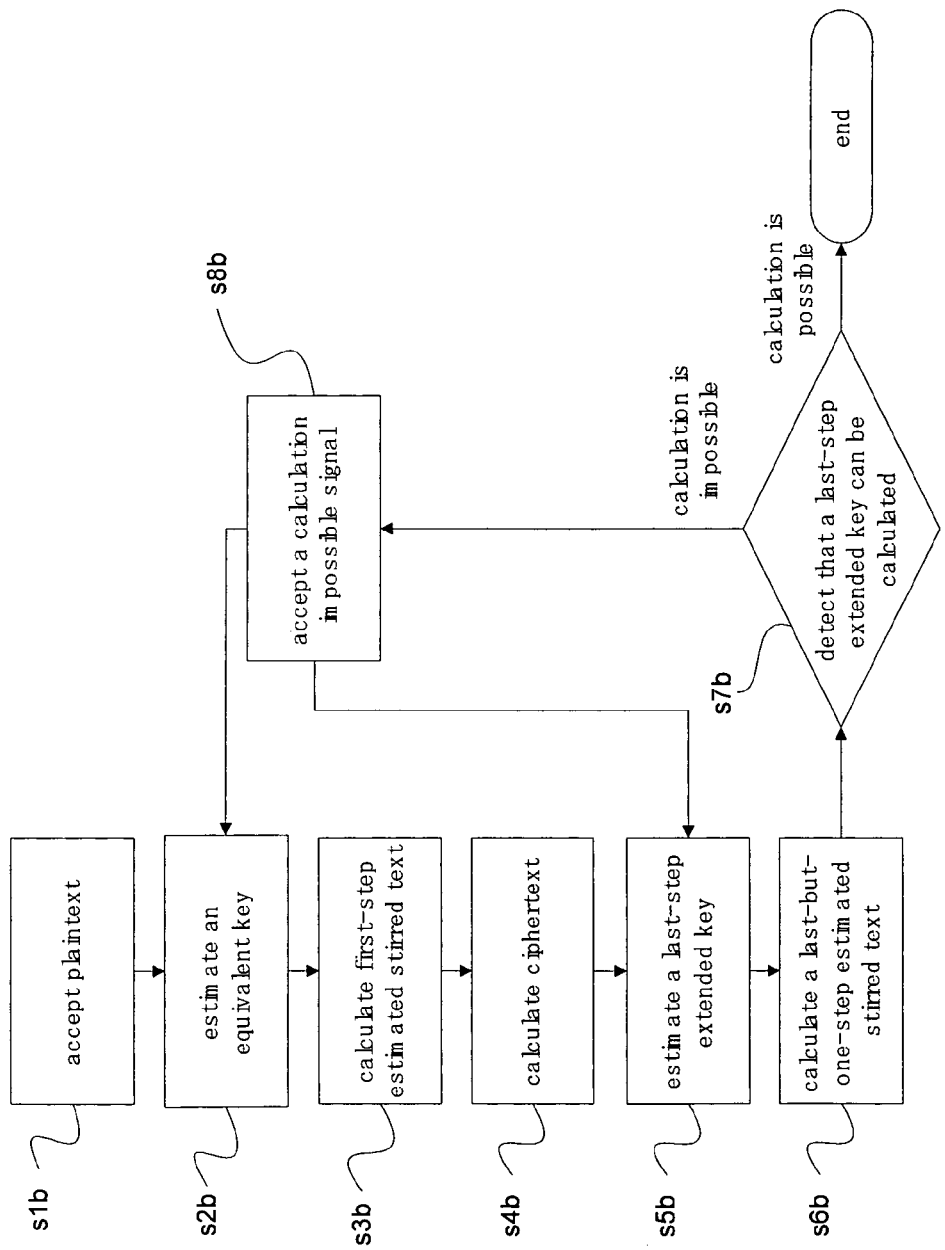
FIG. 21 is a flowchart illustrating an example of the operation of the second embodiment.

Next, the operation of the second embodiment of the cipher strength evaluation apparatus will be described below with reference to the flowchart shown in FIG. 21.

First, the estimated stirred text calculating part 12 accepts plaintext satisfying a predetermined condition (s1b).

The estimated stirred text calculating part 12 estimates an equivalent key by exhaustive search (s2b).

The estimated stirred text calculating part 12 calculates first-step estimated stirred text based on the equivalent key (s3b).

Ciphertext is calculated under the control of the encryption control apparatus 2 (s4b).

The last-but-one-step estimated stirred text calculating part 33 estimates an extended key at the last step by exhaustive search (s5b).

The last-but-one-step estimated stirred text calculating part 33 calculates last-but-one-step estimated stirred text based on the last-step extended key (s6b).

When the key verification part 4 detects that the last-but-one-step extended key can be calculated, it is considered to have obtained the right last-step extended key and the process is finished. However, when it is detected that the last-but-one-step extended key cannot be calculated, it outputs a calculation impossible signal (s7b).

When the decryption control part 5 accepts the calculation impossible signal (s8b), it outputs a recalculation request signal. The estimated stirred text calculating part 12 accepts the recalculation request signal and recalculates an extended key (s1b). Alternatively, the last-but-one-step estimated stirred text calculating part 33 accepts the recalculation request signal and recalculates an extended key (s5b).

In accordance with the procedures, the right last-step extended key is calculated.

That is, MISTY1 with six rounds without the FL function can be decrypted with $2^{39}$ of selected plaintext and the complexity of $2^{49}$ of the FO function by combining the cryptanalysis using higher order differences with the level-1 first-round elimination for MISTY1 with six rounds without the FL function. Moreover, MISTY1 with seven rounds without the FL function can be decrypted by $2^{39}$ of selected plaintext and the complexity of $2^{124}$ of the FO function.

In addition, the invention can be modified variously within the scope not deviating from the teachings. For example, in the flowcharts of the first and second embodiments, some are interchangeable of the order of processing. More specifically, it is acceptable that the process of decrypting plaintext (s4a) can be done before estimation of the equivalent key (s2a) or calculation of estimated stirred text stirred text (s3a).

The estimated stirred text calculating part can be formed to accept any plaintext and calculate stirred text not limited to the plaintext satisfying a predetermined condition, and the key verification part can be formed to perform processing based on only effective stirred text.

Moreover, it is acceptable that the estimated stirred text calculating part, the predetermined-step estimated stirred text calculating part, and the second predetermined-step estimated stirred text calculating part use conditions held on higher order differences of stirred text outputted at predetermined steps in place of the extended key at each of the stirring steps being estimated individually by exhaustive search.

What is claimed is:

1. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated plaintext calculating part for accepting predetermined-step stirred text being stirred text at a predetermined step, calculating an estimated parameter A, estimated as a parameter A, determined from a predetermined-step extended key being an extended key at a predetermined step, and calculating estimated plaintext based on the predetermined-step stirred text and the estimated parameter A;

an encryption control part for using and allowing an encryption apparatus to calculate estimated ciphertext based on the estimated plaintext calculated by the estimated plaintext calculating part;

a key verification part for formulating an encryption equation with higher order differences based on the predetermined-step stirred text accepted by the estimated plaintext calculating part and the estimated ciphertext calculated under the control of the encryption control part, processing it by an algebraic technique to try to calculate a last-step estimated extended key estimated as an extended key at a last step, verifying the parameter A, to be right by detecting that the last-step estimated extended key can be calculated, calculating a right last-step estimated extended key with a predetermined probability, and outputting a calculation impossible signal when detecting that calculation is impossible; and a decryption control part for accepting the calculation impossible signal, and controlling the estimated plaintext calculating part, the encryption control part, and the key verification part to allow the last-step estimated extended key to be calculated.

2. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated plaintext calculating part for accepting predetermined-step stirred text being stirred text at a predetermined step, calculating an estimated parameter A, estimated as a parameter A, determined from a predetermined-step extended key being an extended key at a predetermined step, and calculating estimated plaintext based on the predetermined-step stirred text and the estimated parameter A;

an encryption control part for using and allowing an encryption apparatus to calculate estimated ciphertext based on the estimated plaintext calculated by the estimated plaintext calculating part;

a second predetermined-step estimated stirred text calculating part for accepting the estimated ciphertext calculated under the control of the encryption control part, calculating a last-step estimated extended key estimated as an extended key at the last step, and calculating second predetermined-step estimated stirred text estimated as stirred text at a second predetermined step based on the estimated ciphertext and the last-step estimated extended key;

a key verification part for formulating an encryption equation with higher order differences based on the predetermined-step stirred text accepted by the estimated plaintext calculating part and the second predetermined-step estimated stirred text calculated by the second predetermined-step estimated stirred text calculating part, processing it by an algebraic technique to try to calculate a second predetermined-step estimated extended key estimated as an extended key at the second predetermined step, verifying the parameter A, and the last-step estimated extended key to be right by detecting that the second predetermined-step estimated extended key can be calculated, and outputting a calculation impossible signal when detecting that calculation is impossible; and a decryption control part for accepting the calculation impossible signal, and controlling the estimated plaintext calculating part, the encryption control part, the second predetermined-step estimated stirred text calculating part, and the key verification part to allow the second predetermined-step estimated extended key to be calculated.

3. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated plaintext calculating part for accepting first-step stirred text being stirred text at a first step, calculating an estimated parameter A, estimated as a parameter A, determined from a first-step extended key being an extended key at the first step by exhaustive search, and calculating estimated plaintext based on the first-step stirred text and the estimated parameter A;

an encryption control part for using and allowing an encryption apparatus to calculate estimated ciphertext based on the estimated plaintext calculated by the estimated plaintext calculating part;

a key verification part for formulating an encryption equation with higher order differences based on the first-step stirred text accepted by the estimated plaintext calculating part and the estimated ciphertext calculated under the control of the encryption control part, processing it by an algebraic technique to try to calculate a last-step estimated extended key estimated as an extended key at a last step, verifying the parameter A, to be right by detecting that the last-step estimated extended key can be calculated, calculating a right last-step estimated extended key with a predetermined probability, and outputting a calculation impossible signal when detecting that calculation is impossible; and a decryption control part for accepting the calculation impossible signal, and controlling the estimated plaintext calculating part, the encryption control part, and the key verification part to allow the last-step estimated extended key to be calculated.

4. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated plaintext calculating part for accepting first-step stirred text being stirred text at a first step, calculating an estimated parameter A, estimated as a parameter A, determined from a first-step extended key being an extended key at the first step by exhaustive search, and calculating estimated plaintext based on the first-step stirred text and the estimated parameter A;

an encryption control part for using and allowing an encryption apparatus to calculate estimated ciphertext based on the estimated plaintext calculated by the estimated plaintext calculating part;

a predetermined-step estimated stirred text calculating part for accepting the estimated ciphertext calculated under the control of the encryption control part, calculating a last-step estimated extended key estimated as an extended key at the last step, and calculating predetermined-step estimated stirred text estimated as stirred text at a predetermined step based on the estimated ciphertext and the last-step estimated extended key;

a key verification part for formulating an encryption equation with higher order differences based on the first-step stirred text accepted by the estimated plaintext calculating part and the predetermined-step estimated stirred text calculated by the predetermined-step estimated stirred text calculating part, processing it by an algebraic technique to try to calculate a predetermined-step estimated extended key estimated as an extended key at the predetermined step, verifying the parameter A and the last-step estimated extended key to be right by detecting that calculation is possible, and outputting a calculation impossible signal when detecting that calculation is impossible; and a decryption control part for accepting the calculation impossible signal, and controlling the estimated plaintext calculating part, the encryption control part, the predetermined-step estimated stirred text calculating part, and the key verification part to allow the predetermined-step estimated extended key to be calculated.

5. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated plaintext calculating part for accepting first-step stirred text being stirred text at a first step, calculating an estimated parameter A, estimated as a parameter A, determined from a first-step extended key being an extended key at a first step by exhaustive search, and calculating estimated plaintext based on the first-step stirred text and the estimated parameter A;

an encryption control part for using and allowing an encryption apparatus to calculate estimated ciphertext based on the estimated plaintext calculated by the estimated plaintext calculating part;

a last-but-one-step estimated stirred text calculating part for accepting the estimated ciphertext calculated under the control of the encryption control part, calculating a last-step estimated extended key estimated as an extended key at a last step by exhaustive search, and calculating last-but-one-step estimated stirred text estimated as stirred text at a last-but-one step being a preceding step of the last step based on the estimated ciphertext and the last-step estimated extended key;

a key verification part for formulating an encryption equation with higher order differences based on the first-step stirred text accepted by the estimated plaintext calculating part and the last-but-one-step estimated stirred text calculated by the last-but-one-step estimated stirred text calculating part, processing it by an algebraic technique to try to calculate a last-but-one-step extended key estimated as an extended key at the last-but-one step, verifying the parameter A, and the last-step estimated extended key to be right by detecting that calculation is possible, and outputting a calculation impossible signal when detecting that calculation is impossible; and a decryption control part for accepting the calculation impossible signal, and controlling the estimated plaintext calculating part, the encryption control part, the last-but-one-step estimated stirred text calculating part, and the key verification part to allow the last-but-one-step extended key to be calculated.

6. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated stirred text calculating part for accepting the plaintext satisfying a predetermined condition, calculating an estimated parameter A, estimated as a parameter A, determined from a first-step extended key being an extended key at a first step, and calculating predetermined-step estimated stirred text satisfying a predetermined condition and estimated as stirred text at a predetermined step based on the plaintext and the estimated parameter A;

an encryption control part for using and allowing an encryption apparatus to calculate ciphertext based on the plaintext accepted by the estimated stirred text calculating part;

a key verification part for formulating an encryption equation with higher order differences based on the predetermined-step estimated stirred text calculated by the estimated stirred text calculating part and the ciphertext calculated under the control of the encryption control part, processing it by an algebraic technique to try to calculate a last-step extended key estimated as an extended key at a last step, verifying the parameter A, to be right by detecting that the last-step estimated extended key can be calculated, calculating the last-step estimated extended key with a predetermined probability, and outputting a calculation impossible signal when detecting that calculation is impossible; and a decryption control part for accepting the calculation impossible signal, and controlling the estimated stirred text calculating part, the encryption control part, and the key verification part to allow the last-step estimated extended key to be calculated.

7. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated stirred text calculating part for accepting the plaintext satisfying a predetermined condition, calculating an estimated parameter A, estimated as a parameter A, determined from a first-step extended key being an extended key at a first step, and calculating predetermined-step estimated stirred text satisfying a predetermined condition and estimated as stirred text at a predetermined step based on the plaintext and the estimated parameter A;

an encryption control part for using and allowing an encryption apparatus to calculate ciphertext based on the plaintext accepted by the estimated stirred text calculating part;

a second predetermined-step estimated stirred text calculating part for accepting the ciphertext calculated under the control of the encryption control part, calculating a last-step estimated extended key estimated as an extended key at a last step, and calculating second predetermined-step estimated stirred text estimated as stirred text at a second predetermined step based on the ciphertext and the last-step estimated extended key;

a key verification part for formulating an encryption equation with higher order differences based on the predetermined-step estimated stirred text stirred text calculated by the estimated stirred text calculating part and the second predetermined-step estimated stirred text calculated by the second predetermined-step estimated stirred text calculating part, processing it by an algebraic technique to try to calculate a second predetermined-step extended key estimated as an extended key at the second predetermined step, verifying the parameter A and the last-step estimated extended key to be right by detecting that the second predetermined-step extended key can be calculated, and outputting a calculation impossible signal when detecting that calculation is impossible; and a decryption control part for accepting the calculation impossible signal, and controlling the estimated stirred text calculating part, the encryption control part, the second predetermined-step estimated stirred text calculating part, and the key verification part to allow the second predetermined-step estimated extended key to be calculated.

8. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated stirred text calculating part for accepting the plaintext satisfying a predetermined condition, calculating an estimated parameter A, estimated as a parameter A, determined from a first-step extended key being an extended key at a first step by exhaustive search, and calculating first-step estimated stirred text satisfying a predetermined condition and estimated as stirred text at a first step based on the plaintext and the estimated parameter A;

an encryption control part for using and allowing an encryption apparatus to calculate ciphertext based on the plaintext accepted by the estimated stirred text calculating part;

a key verification part for formulating an encryption equation with higher order differences based on the first-step estimated stirred text calculated by the estimated stirred text calculating part and the ciphertext calculated under the control of the encryption control part, processing it by an algebraic technique to try to calculate a last-step estimated extended key estimated as an extended key at a last step, verifying the parameter A, to be right by detecting that the last-step estimated extended key can be calculated, calculating the last-step estimated extended key with a predetermined probability, and outputting a calculation impossible signal when detecting that calculation is impossible; and a decryption control part for accepting the calculation impossible signal, and controlling the estimated stirred text calculating part, the encryption control part, and the key verification part to allow the last-step estimated extended key to be calculated.

9. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated stirred text calculating part for accepting the plaintext satisfying a predetermined condition, calculating an estimated parameter A, estimated as a parameter A, determined from a first-step extended key being an extended key at a first step by exhaustive search, and calculating first-step estimated stirred text satisfying a predetermined condition and estimated as stirred text at a first step based on the plaintext and the estimated parameter A;

an encryption control part for using and allowing an encryption apparatus to calculate ciphertext based on the plaintext accepted by the estimated stirred text calculating part;

a predetermined-step estimated stirred text calculating part for accepting the ciphertext calculated under the control of the encryption control part, calculating a last-step estimated extended key estimated as an extended key at a last step, and calculating predetermined-step estimated stirred text estimated as stirred text at a predetermined step based on the ciphertext and the last-step estimated extended key;

a key verification part for formulating an encryption equation with higher order differences based on the first-step estimated stirred text calculated by the estimated stirred text calculating part and the predetermined-step estimated stirred text calculated by the predetermined-step estimated stirred text calculating part, processing it by an algebraic technique to try to calculate a predetermined-step estimated extended key estimated as an extended key at the predetermined step, verifying the parameter A, and the last-step estimated extended key to be right by detecting that the predetermined-step estimated extended key can be calculated, and outputting a calculation impossible signal when detecting that calculation is impossible; and a decryption control part for accepting the calculation impossible signal, and controlling the estimated stirred text calculating part, the encryption control part, the predetermined-step estimated stirred text calculating part, and the key verification part to allow the predetermined-step estimated extended key to be calculated.

10. A cipher strength evaluation apparatus for evaluating strength on ciphertext outputted by a Feistel encryption apparatus having a plurality of steps of accepting unstirred text, stirring with an extended key, and calculating stirred text for encrypting plaintext step by step, the cipher strength evaluation apparatus comprising:

an estimated stirred text calculating part for accepting the plaintext satisfying a predetermined condition, calculating an estimated parameter A, estimated as a parameter A, determined from a first-step extended key being an extended key at a first step by exhaustive search, and calculating first-step estimated stirred text satisfying a predetermined condition and estimated as stirred text at a first step based on the plaintext and the estimated parameter A;

an encryption control part for using and allowing an encryption apparatus to calculate ciphertext based on the plaintext accepted by the estimated stirred text calculating part;

a last-but-one-step estimated stirred text calculating part for accepting the ciphertext calculated under the control of the encryption control part, calculating a last-step estimated extended key estimated as an extended key at a last step by exhaustive search, and calculating last-but-one-step estimated stirred text estimated as stirred text at a last-but-one step based on the ciphertext and the last-step estimated extended key;

a key verification part for formulating an encryption equation with higher order differences based on the first-step estimated stirred text accepted by the estimated stirred text calculating part and the last-but-one-step estimated stirred text calculated by the last-but-one-step estimated stirred text calculating part, processing it by an algebraic technique to try to calculate a last-but-one-step extended key estimated as an extended key at the last-but-one step, verifying the parameter A and the last-step estimated extended key to be right by detecting that calculation is possible, and outputting a calculation impossible signal when detecting that calculation is impossible; and a decryption control part for accepting the calculation impossible signal, and controlling the estimated stirred text calculating part, the encryption control part, the last-but-one-step estimated stirred text calculation part and the key verification part to allow the last-but-one-step estimated extended key to be calculated.

11. The cipher strength evaluating apparatus of claim 1 wherein the parameter A allows an extended key to be calculated by simple logic operation with a known value.

12. The cipher strength evaluating apparatus of claim 1 wherein the parameter A is an equivalent key that an extended key is XOR-ed with a constant.

* * * * *